United States Patent
Bloch

(10) Patent No.: US 8,519,286 B1
(45) Date of Patent: Aug. 27, 2013

(54) WATERPROOF OPERATING DEVICE WITH ONE OR MORE CAPACITIVE SWITCHES

(71) Applicant: Pioneer & Co., Inc., Moorestown, NJ (US)

(72) Inventor: Nathan Bloch, Cherry Hill, NJ (US)

(73) Assignee: Pioneer & Co., Inc., Moorestown, NJ (US)

( * ) Notice: Subject to any disclaimer, the term of this patent is extended or adjusted under 35 U.S.C. 154(b) by 0 days.

(21) Appl. No.: 13/673,137

(22) Filed: Nov. 9, 2012

Related U.S. Application Data

(63) Continuation-in-part of application No. 13/448,905, filed on Apr. 17, 2012, now Pat. No. 8,344,277, which is a continuation-in-part of application No. 12/717,451, filed on Mar. 4, 2010, now Pat. No. 8,158,899.

(51) Int. Cl.
  *H01H 13/06* (2006.01)

(52) U.S. Cl.
  USPC .................................................. 200/302.2

(58) Field of Classification Search
  USPC ............... 200/341, 302.1–302.3, 5 R, 304; 361/679.02
  See application file for complete search history.

(56) References Cited

U.S. PATENT DOCUMENTS

| | | | |
|---|---|---|---|
| 2,981,816 A | 4/1961 | Cozart | |
| 3,890,480 A | 6/1975 | Berling et al. | |
| 4,170,104 A | 10/1979 | Yamagata | |
| 5,172,805 A | 12/1992 | Gumb | |
| 5,258,592 A | 11/1993 | Nishikawa et al. | |
| 5,367,133 A | 11/1994 | Schmidt et al. | |
| 5,681,122 A * | 10/1997 | Burke | 400/472 |
| 5,933,133 A | 8/1999 | Lohr | |
| 5,952,634 A | 9/1999 | Yoshida | |
| 6,054,939 A | 4/2000 | Wei et al. | |
| 6,354,210 B1 | 3/2002 | Chao | |
| 6,467,683 B2 | 10/2002 | Jun | |
| 6,747,223 B2 * | 6/2004 | Hattori | 200/302.1 |
| 6,963,039 B1 | 11/2005 | Weng et al. | |
| 7,012,206 B2 * | 3/2006 | Oikawa | 200/302.1 |
| 7,038,598 B2 | 5/2006 | Uke | |
| 7,230,195 B2 | 6/2007 | Ohnishi | |
| 7,355,137 B2 | 4/2008 | Kawasaki et al. | |
| 7,510,342 B2 * | 3/2009 | Lane et al. | 400/472 |

(Continued)

FOREIGN PATENT DOCUMENTS

| | | |
|---|---|---|
| CH | 613592 A | 10/1979 |
| JP | 53-020957 A | 12/1993 |

OTHER PUBLICATIONS http://tat7.net/webshaper/store/viewProd.asp?pkProductItem=2 Copyright 2011.

(Continued)

*Primary Examiner* — Edwin A. Leon
(74) *Attorney, Agent, or Firm* — Panitch Schwarze Belisario & Nadel LLP

(57) ABSTRACT

A waterproof housing to contain and operate an electronic device with capacitive touch screen and electrically conductive outer case includes interfitting pieces configured to form a waterproof shell to removably receive and immobilize the electronic device. One or more electrical circuits extend within the shell between the outer case of the electronic device installed in the shell and one or more respective control regions of the screen. Manual actuators such as buttons are provided in openings through the shell to selectively manually complete each circuit from outside the housing.

23 Claims, 17 Drawing Sheets

(56) References Cited

U.S. PATENT DOCUMENTS

| | | | |
|---|---|---|---|
| 7,525,792 | B2 | 4/2009 | Yokote |
| 8,158,899 | B2 | 4/2012 | Bloch |
| 8,344,277 | B1 | 1/2013 | Bloch |
| 2009/0020402 | A1 | 1/2009 | Ichikawa et al. |
| 2012/0026123 | A1 | 2/2012 | Grunthaner et al. |
| 2012/0026127 | A1 | 2/2012 | Kim |

OTHER PUBLICATIONS i-patima i-phone 4/4S Housing User's Manual, 12 pages, date unknown.

i-phone 4/4S Housing 1 page of specification of case. date unknown(bottom cutoff).

www.patimahousing.com. Product Manuals i-Patima Housing application instructions 5 pages. date unknown.

http://patima.nayana.kr/xe/files/attach/images/912/792/003/lgphonehousinge.jpg 1 page. date uknown.

www.zappium.com/apps/bes/iphone-native/Category-Sports 3 pages. Apr. 2012.

http://www.forevergeek.com/2012/01/patima-iphone-4s-underwater-case/ 5 pages, Jan. 20, 2012.

* cited by examiner

WATERPROOF OPERATING DEVICE WITH ONE OR MORE CAPACITIVE SWITCHES

CROSS-REFERENCE TO RELATED APPLICATIONS

This application is a continuation-in-part of U.S. application Ser. No. 12/717,451 filed Mar. 4, 2010, now U.S. Pat. No. 8,158,899 issued Apr. 17, 2012 and of U.S. patent application Ser. No. 13/448,905 filed Apr. 17, 2012, both incorporated by reference in their entirety herein.

BACKGROUND OF THE INVENTION

The present invention is directed to a waterproof operating device having superior resistance to water pressure. More particularly, the present invention is directed to a waterproof operating device for use in underwater electronic devices, particularly devices with capacitive switches such as such as the newest generation camera equipped cell phones with capacitive operating touch screens.

Electronic devices designed for underwater use are generally known. Examples of such devices include cameras, watches, computers, hand lights, etc. Often, underwater electronic devices are equipped with one or more buttons for actuation of one or more corresponding switch elements in order to initiate the desired operations. To protect the switch elements from water damage, underwater electronic devices must be equipped with a waterproof seal. Such a waterproof seal is typically achieved by surrounding a portion of the shaft of each button by an O-ring. However, the necessary installation of an O-ring results increased manufacture costs and delay and O-rings are susceptible to failure due to various causes.

Underwater electronic devices must also be equipped with a means to prevent unintentional depression of the buttons and unintentional actuation of the corresponding switch elements. Specifically, each button must generate sufficient spring force to resist water pressure from unintentionally depressing the buttons. The requisite spring force for each button is typically achieved in one of two ways: the electronic device may be filled with a viscous fluid, such as silicone oil, or, alternatively, each button may be equipped with a compression spring. However, the conventional configuration of underwater electronic devices cannot resist water pressure up to great depths in water without actuation of the switch elements.

More and more electronic devices such as smart phone, smart pads, smart readers, etc. are being supplied with a capacitive touch screen substituting for push buttons to combine the display and control functions in a single graphic user interface. These include iPhone®, iPod Touch®, and iPad® device from Apple Inc. of Cupertino, Calif. and like devices from other manufacturers. Smart phone are also replacing conventional cameras for many users. Such devices are not responsive to pressure activation as were cameras and older cell phones with ordinary electro-mechanical control buttons.

It would be desirable to provide a waterproof operating device that can withstand water pressure exerted upon external buttons up to much greater depths without actuation of the associated, underlying switch elements. It would also be desirable to provide a simpler and more efficient mechanism for attaining a waterproof seal for such operating devices to be utilized in electronic devices designed for underwater use, particularly electronic devices with capacitive touch switches. It is further desirable to provide a simpler waterproof operating device that is not adversely affected by contamination present in an underwater environment.

BRIEF SUMMARY OF THE INVENTION

Briefly stated, in its most basic form, the present invention is a waterproof housing for containing and operating an electronic device having a capacitive touch screen and an electrically conductive outer case comprising: a plurality of essentially rigid, interfitting housing pieces forming a waterproof shell configured to removably receive and essentially immobilize the electronic device, a first housing piece including at least a first opening entirely through the shell; a first electrical circuit extending between the electrically conductive outer case of the electronic device installed in the waterproof housing and a first control region of the capacitive touch screen; and first means operating through the first opening for manually completing the first electrical circuit from outside the housing.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The following detailed description of the preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings:

FIG. 1 is a perspective view of a waterproof keypad in accordance with a first preferred embodiment of the present invention in an assembled configuration.

FIG. 2 is a perspective exploded view of the waterproof keypad shown in FIG. 1;

FIG. 3 is a cross-sectional view of a waterproof operating device in accordance with a preferred embodiment of the present invention;

FIG. 4 is a bottom plan view of a portion of an elastic member in accordance with another preferred embodiment of the present invention;

FIG. 5 is a plan view of a second preferred embodiment waterproof housing containing and operating an electronic device having a capacitive touch screen and an electrically conductive outer case for underwater use according to the present invention;

FIG. 6 is a perspective exploded view of the housing with device of FIG. 5;

FIG. 7 is a diagrammatic cross-sectioned view of the housing with the device of FIGS. 5 and 6 broken away along the lines 7-7 in FIG. 5;

FIG. 8 is an exploded view of a third preferred embodiment waterproof housing of the present invention for electronic device with capacitive touch screen employing buttons with O-ring seals;

FIG. 9 is a broken away view of the assembled device of FIG. 8;

FIG. 10 is a rear perspective view of a fourth preferred embodiment waterproof housing according to the present invention;

FIG. 11 is a partially exploded view of the housing of FIG. 10;

Figure 10:
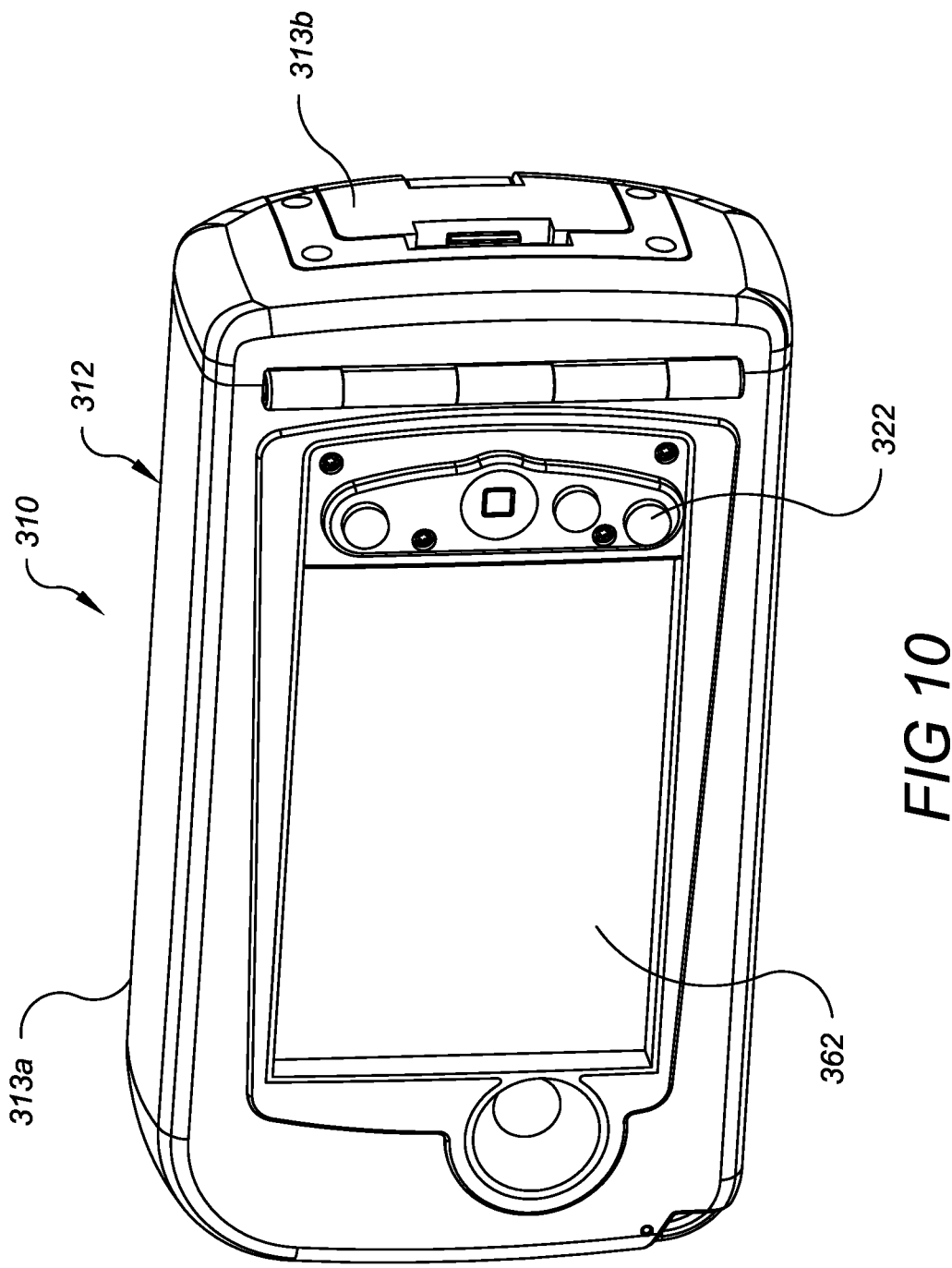
Figure 12:
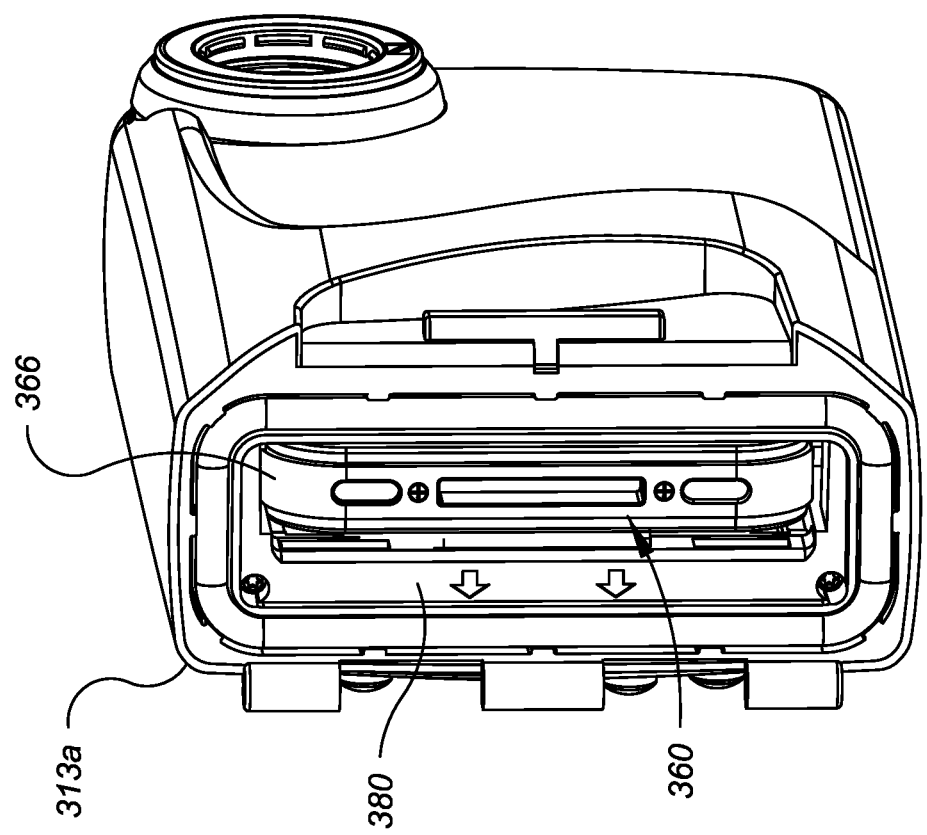
Figure 13:
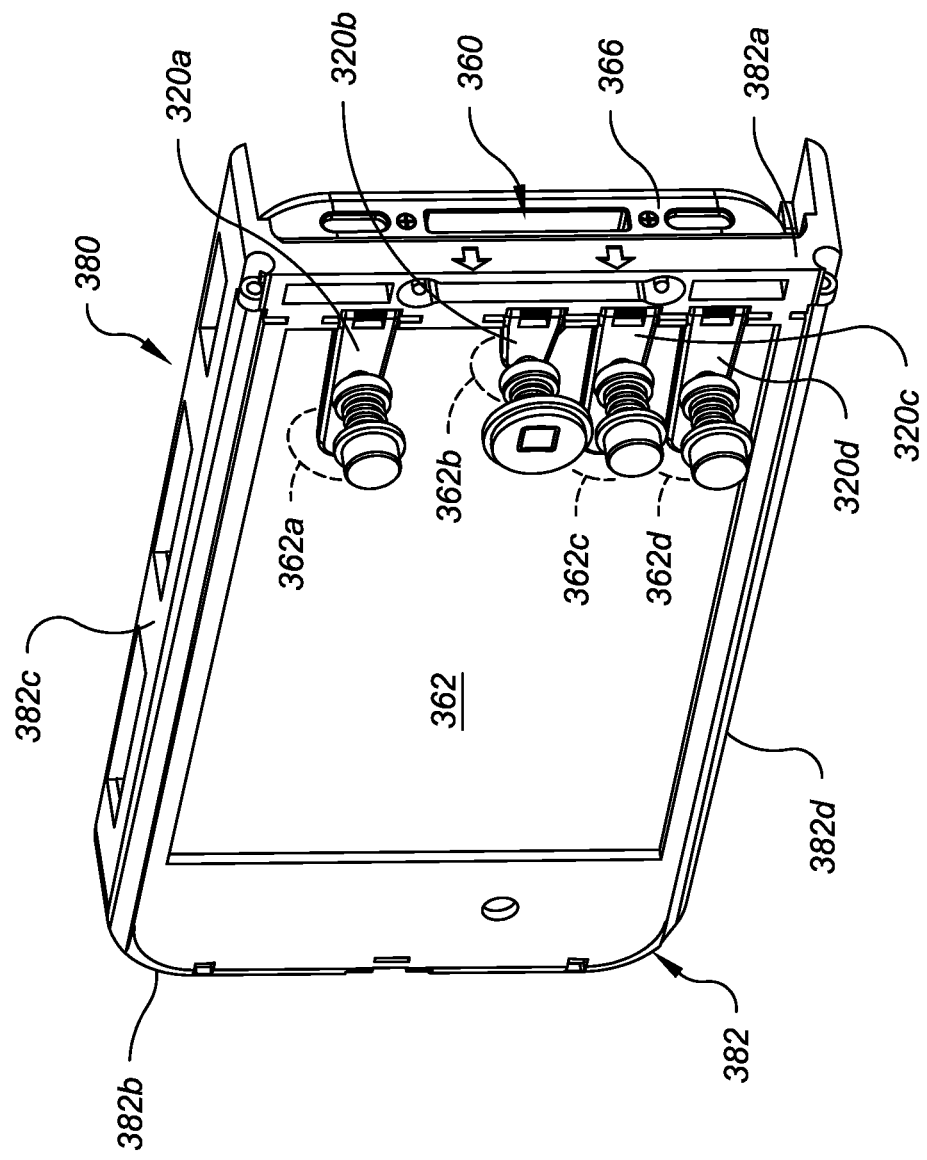
Figure 14:
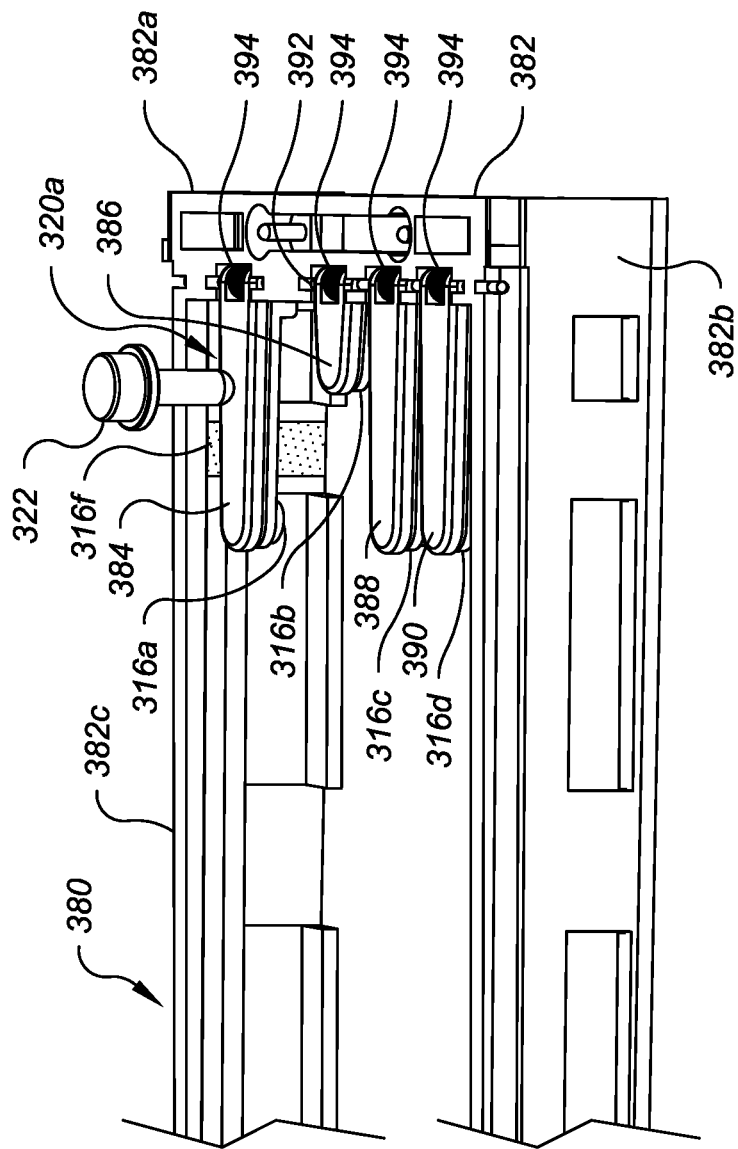
Figure 15:
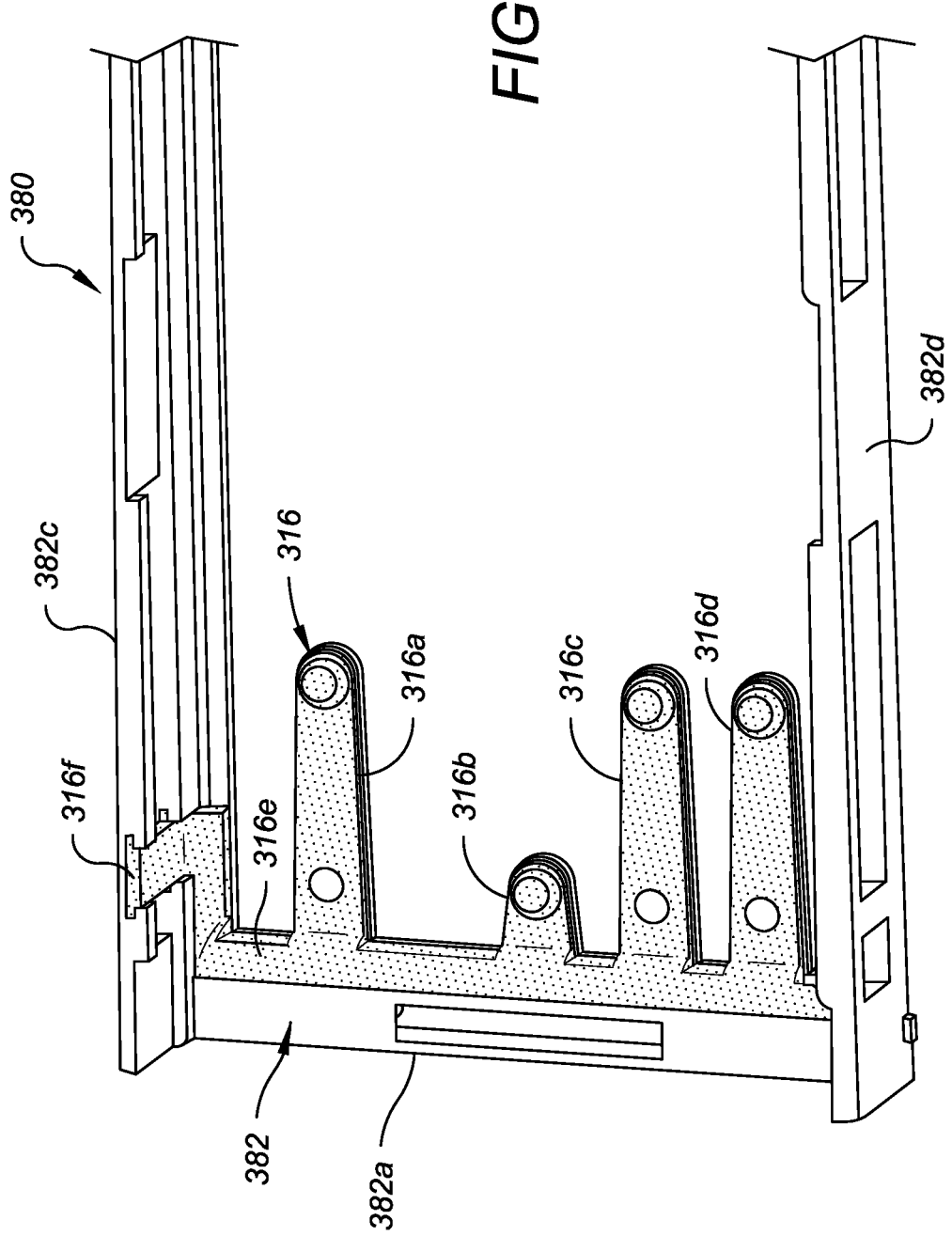
Figure 16:
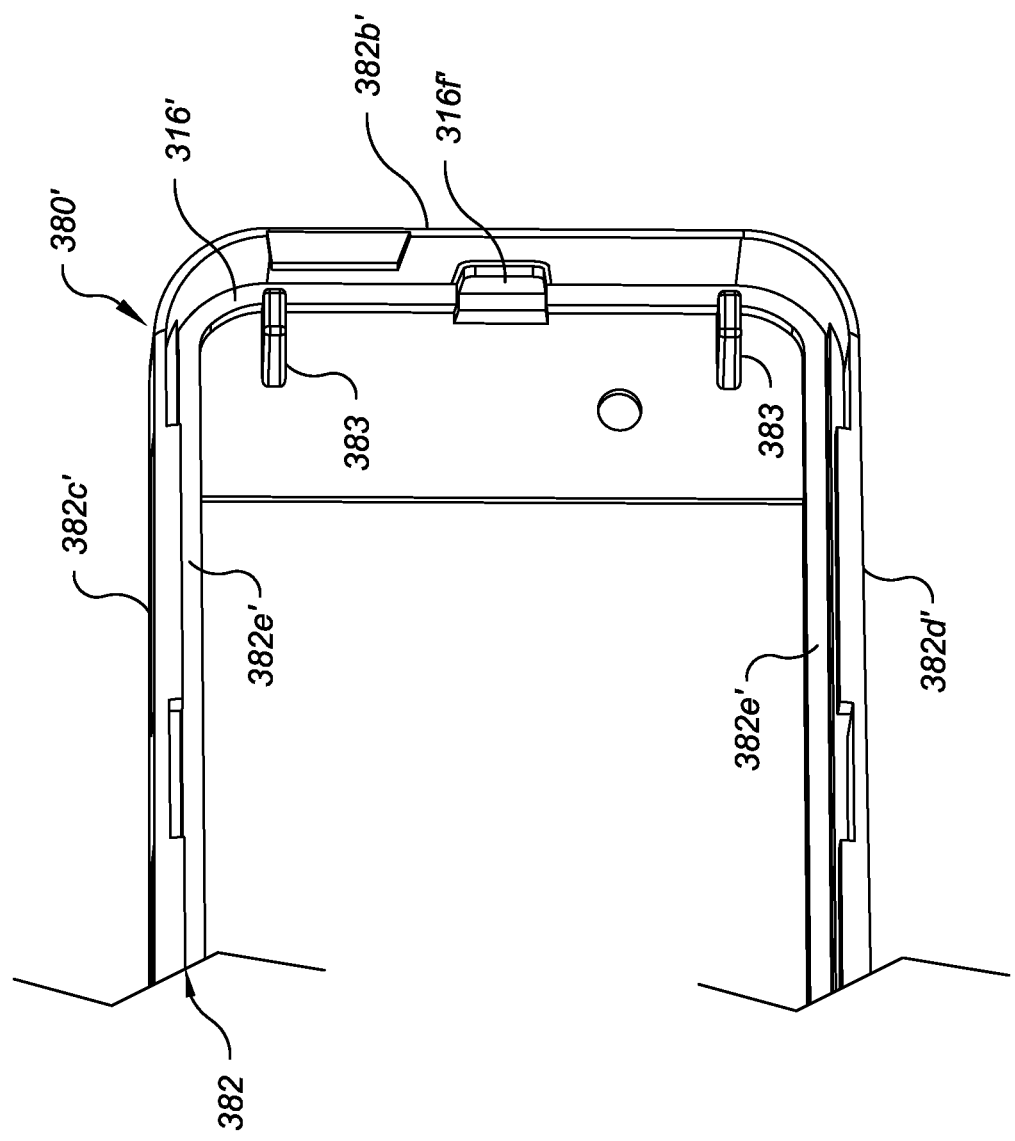
Figure 17:
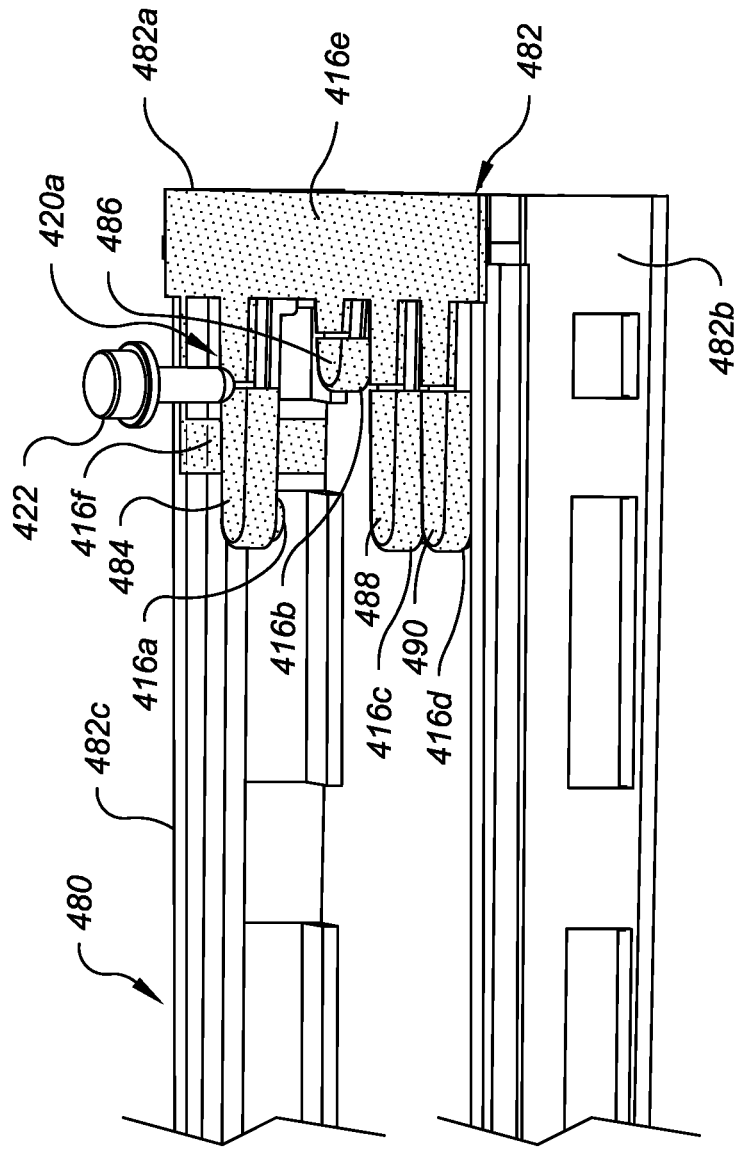

FIG. 12 is a rear perspective view of the housing of FIG. 10 with an end cover removed to reveal a tray holding an electronic device within an outer, waterproof shell portion of the housing;

FIG. 13 illustrates the tray portion of the housing and electronic device held in the tray within the outer, waterproof shell portion of the housing;

FIG. 14 is a perspective view of an outer facing side of the tray;

FIG. 15 is a perspective view of an opposing, inward facing side of the tray;

FIG. 16 is a perspective view of another form of tray;

FIG. 17 is a perspective view of yet another form of tray

Figure 19:
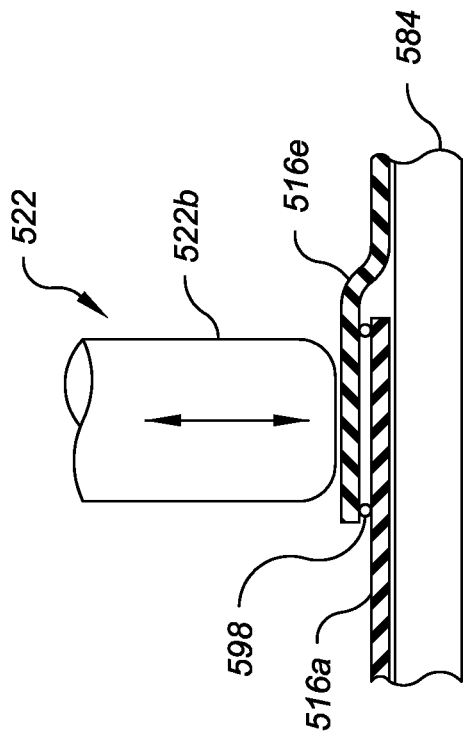
Figure 18:
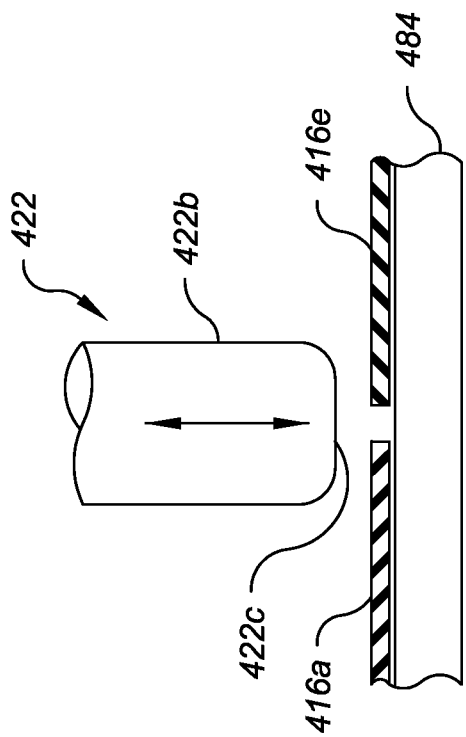

FIG. 18 is a diagrammatic side elevation of a selective electrical connection to be made in the tray of FIG. 17; and FIG. 19 is a diagrammatic side elevation of an alternate selective electrical connection to be made in the tray of FIG. 17.

DETAILED DESCRIPTION OF THE INVENTION

Certain terminology is used in the following description for convenience only, and is not limiting. The words "right," "left," "upper," and "lower" designate directions in the drawings to which reference is made. The words "inwardly" and "outwardly" refer to directions toward and away from, respectively, the geometric center of the waterproof operating device and designated parts thereof. Additionally, the word "a" as used in the specification means "at least one." The terminology includes the words specifically mentioned, derivatives thereof and words of similar import.

Figure 1:
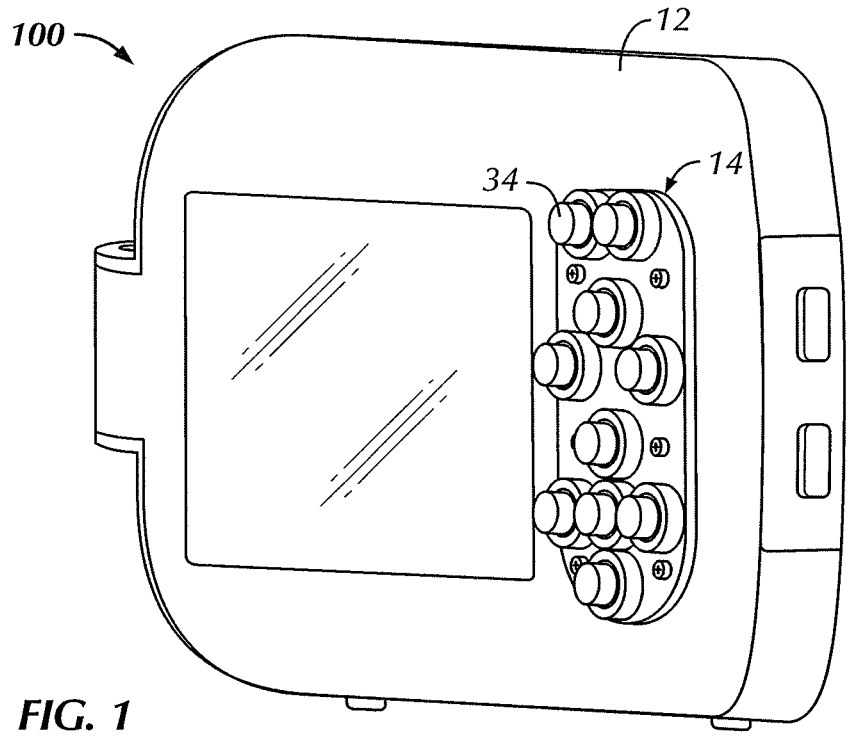
Figure 2:
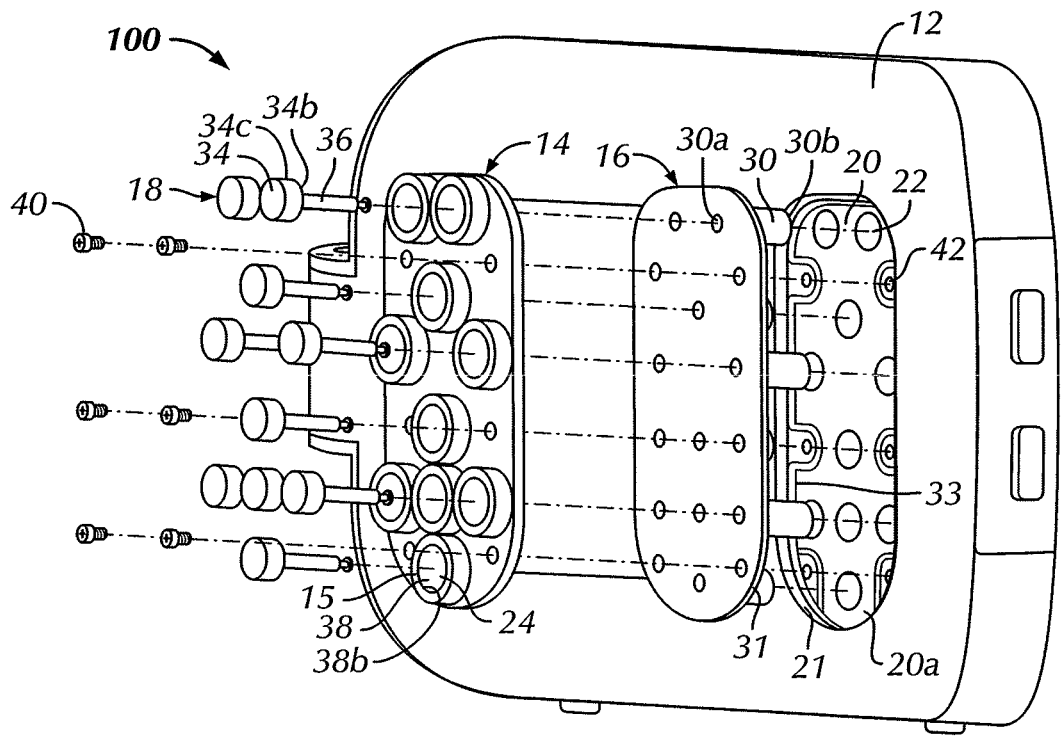

Referring to FIGS. 1-2, a waterproof operating device 10 includes a housing 12, a cover plate 14 and an elastic member 16. In the attached figures, the waterproof operating device 10 is shown as being utilized in an underwater camera. However, the waterproof operating device 10 may be utilized in any type of electronic device designed for underwater use.

The housing 12 includes a support surface 20, which is inelastic and, more preferably, rigid. The housing 12 is a pressure resistant housing and is preferably may be made of, for example, a polycarbonate. However, it will be understood by those of ordinary skill in the art that the housing 12 may be made of any appropriate material for underwater use, such as stainless steel. An elastomeric coating may optionally be applied to the housing 12 for both abrasion and impact resistance purposes and to increase the aesthetic appeal of the housing 12. The support surface 20 has at least one opening 22 formed therethrough and, more preferably, has a plurality of openings 22 formed therethrough. The opening 22 extends through the entire thickness of the support surface 20 and, preferably, is generally cylindrical in shape. However, the opening 22 may be of any appropriate shape, such as ovular or elliptical.

The cover plate 14 is inelastic and more preferably rigid, and may be made of, for example, aluminum, stainless steel or a polymeric material. Preferably, the cover plate 14 is made of a polycarbonate material. The cover plate 14 preferably includes at least one raised cylindrical section 15 which includes a depression or well 38 formed therein. Preferably, the well has a height of at least 0.080 inches. More preferably, the cover plate 14 includes a plurality of cylindrical sections 15 and corresponding wells 38 formed therein.

Figure 3:
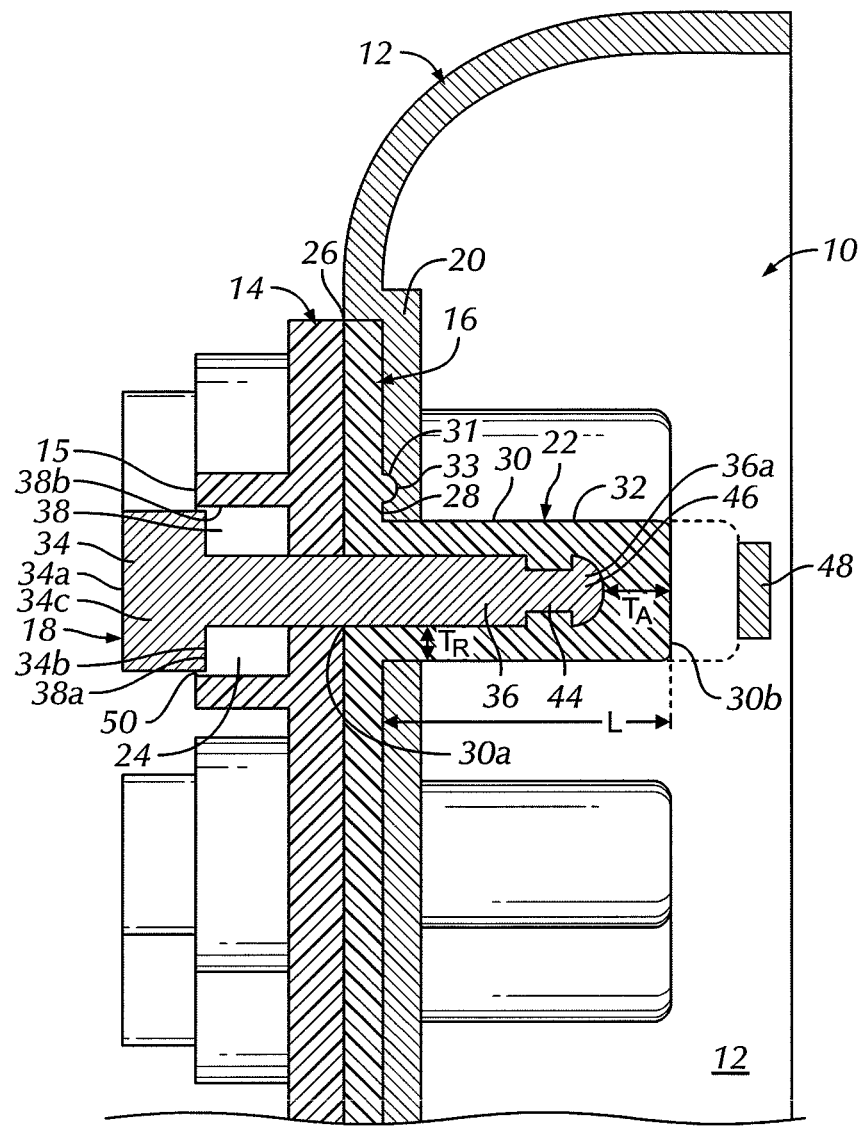

Referring to FIGS. 1-3, in the assembled configuration, the cover plate 14 is positioned over the support surface 20 and includes at least one opening 24 formed therethrough and, more preferably, includes a plurality of openings 24 formed therethrough. Specifically, the opening 24 is formed in and extends through the well 38 formed in the cover plate 14. Similar to the design of the opening 22, the opening 24 extends through a thickness of the cover plate 14 and, preferably, is generally cylindrical in shape. In the assembled configuration, the opening 24 formed through the cover plate 14 is located over the opening 22 formed through the support surface 20. The openings 24 and 22 of the pluralities are at least generally coaxially aligned with each other.

Referring to FIGS. 1 and 3, in the assembled configuration, the elastic member 16 is located between the support surface 20 and the cover plate 14. The elastic member 16 has a first major surface 26, a second major surface 28 opposite the first major surface 26, and at least one protrusion 30 extending from the second major surface 28. The first major surface 26 is in direct contact with the cover plate 14 and the second major surface 28 is in direct contact with the support surface 20. Further, the protrusion 30 extends through the at least one opening 22 formed through the support surface 20. Preferably, if the support surface 20 includes a plurality of through openings 22 and the cover plate 14 includes a plurality of through openings 24, the elastic member 16 contains a plurality of protrusions 30 as shown in FIG. 2, one for each axially aligned pair of openings 22, 24. The elastic member 16 is a stretchable one-piece elastomeric membrane that may be made of, for example, silicone, urethane, or EPDM rubber. Preferably, the elastic member 16 is made of silicone.

Each protrusion 30 includes an open end 30a at the first major surface 26 and an opposing closed end 30b. More particularly, the open end 30a of each protrusion extends through the thickness of the elastic member and is generally aligned with the at least one opening 24 formed through the cover plate 14. A tubular wall 32 of the protrusion 30 extends between the second major surface 28 of the elastic member 16 and the closed end 30b of the protrusion 30. Accordingly, the protrusion 30 has a generally cylindrical shape and a recess formed by the tubular wall 32 between the open end 30a and the distal and opposing closed end 30b is configured to receive an object.

The diameter of the opening 22 in the support surface 20 is preferably just slightly larger than that of the tubular wall 32 of the protrusion 30 for ease of assembly, but may, in fact, be equal to or even slightly smaller that that of the tubular wall 32, for better sealing. As such, in the assembled configuration with the elastic member 16 positioned between the cover plate 14 and the support surface 20, the tubular wall 32 is of a sufficient size to pass through the opening 22 in the support surface 20 (see FIGS. 2-3). Preferably, the difference in the diameters of the tubular wall 32 and the opening 22 is approximately 0.005 inches. Where the elastic member 16 includes a plurality of protrusions 30, each protrusion 30 underlies one of the plurality of openings 24 in the cover plate 14 and the tubular wall 32 of each protrusion 30 extends through a separate, corresponding opening 22 of the plurality of openings 22 in the support surface 20.

The elastic member 16 has a thickness from the open end 30a of each protrusion 30 radially outward all around the protrusion 30 such that the first major surface 26 is maintained in continuous direct contact with the cover plate 14 and the second major surface 28 is maintained in continuous direct contact with the support surface 20. Accordingly, the elastic member 16 is maintained between and in continuous direct contact with the cover plate 14 and the support surface 20 from the protrusion 30 outward by a close-fitting relationship. Essentially, the elastic member 16 is sandwiched between the cover plate 14 and support surface 20, such that direct contact is maintained over the entire overlapping areas of the three components.

Where the elastic member 16 includes a plurality of protrusions 30, the thickness of the elastic member 16 between the first and second major surfaces 26 and 28, respectively, preferably is uniform (i.e. at least essentially constant) between at least one adjoining pair of the plurality of the protrusions and, more preferably, between each adjoining pair of the plurality of protrusions 30. Accordingly, in the assembled configuration, the first major surface 26 of the elastic member 16 (where the elastic member 16 is present) is in continuous direct contact with the cover plate 14 between adjoining pairs of openings 24 and more preferably, everywhere the elastic member 16 is overlapped by the cover plate 14. Similarly, the second major surface 28 of the elastic member 16 (where the elastic member 16 is present) is in continuous direct contact with the support surface 20 between adjoining pairs of openings 22 and more preferably, everywhere the elastic member 16 overlaps the support surface 20. Because the elastic member 16 is compressed and retained tightly between the cover plate 14 and the support surface 20, the elastic member 16 is not further stretchable between the first and second major surfaces 26 and 28, respectively. Thus, a waterproof seal is achieved around the openings 22, 24 and the protrusion 30.

Referring to FIG. 2, elastic member 16 further preferably includes a ridge 31 which extends or protrudes out from the second major surface 28 of the elastic member 16. The ridge 31 extends around an outer perimeter of the elastic member 16. Preferably, the ridge 31 completely and unbrokenly (i.e., continuously) surrounds the protrusion 30. Where the elastic member 16 includes a plurality of protrusions 30, as shown in FIG. 2, the ridge 31 completely and unbrokenly (i.e., continuously) surrounds the plurality of protrusions 30. In addition, the support surface 20 further includes a recessed area 33 of a similar size and shape as the ridge 31, such that the recessed area 33 is configured to receive the ridge 31. The configuration of the ridge 31 and the recessed area 33 acts as a gasket structure for an increased sealing effect. Specifically, because the ridge 31 mates with the recessed area 33 in the support surface 20, the sealing surface area of the elastic member 16 is increased for better waterproof protection. Further, the ridge 31 and recessed area 33 prevent the elastic member 16 from being drawn into any of the plurality of openings 22 formed through the support surface 20. Instead, because the ridge 31 is received within the recessed area 33, an additional spring force is generated primarily around the perimeter of the elastic member 16 to resist the elastic member 16 being pulled or drawn into the through openings 22.

Figure 4:
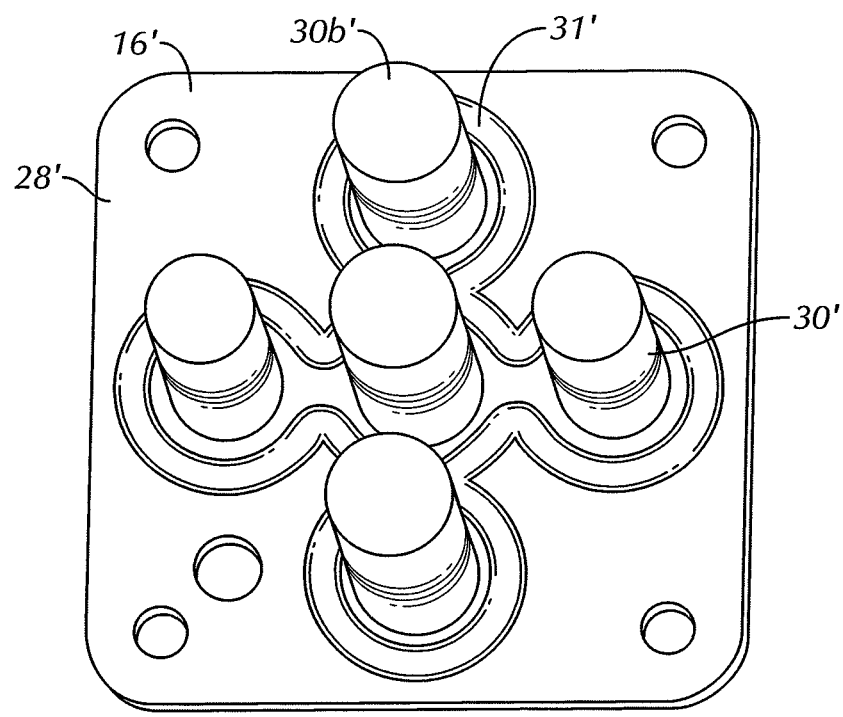

In an alternative embodiment, shown in FIG. 4, an elastic member 16' preferably includes a ridge 31' which extends or protrudes out from a second major surface 28' of the elastic member 16' so as to extend around at least a portion of a circumference of each protrusion 30' and, more particularly, around a circumference of a tubular wall 32' of each protrusion 30', closer to the protrusion 30' than the ridge 31 of the elastic member 16 of the first embodiment. Preferably, the ridge 31' completely and unbrokenly (i.e., continuously) surrounds the circumference of the protrusion 30'. Where the elastic member 16' includes a plurality of protrusions 30', as shown in FIG. 4, the ridge 31' completely and unbrokenly (i.e., continuously) surrounds the plurality of protrusions 30', but is still beyond an area that would be covered by the head portion of any buttons received in the protrusions 30'. The ridge 31' is received within a recessed area (not shown) of a similar size and shape as the ridge 31'. Because the ridge 31' is received within the recessed area, an interference engagement is provided between the elastic member 31' and support surface 20 to resist the elastic member 16' around the tubular wall 32' of each protrusion 30' being pulled or drawn into the through openings 22.

Referring to FIGS. 1-3, in the assembled configuration, the support surface 20, the cover plate 14 and the elastic member 16 are removably and tightly secured to each other by a plurality of retaining members 40. The retaining members 40 pass entirely through openings 17 and 19 in the cover plate 14 and the elastic member 16, respectively, and into the closed-end of recesses 42 formed in the support surface 20. Preferably, the recesses 42 are threaded and the retaining members 40 are threaded fasteners, such as screws or bolts, with matching or corresponding threads. However, the retaining members 40 may be in the form of any appropriate securing or attaching means, such as nuts, bayonet fasteners or even dowels or tight-fitted pins, etc., as external water pressure will keep the cover plate 14 firmly pressed against the elastic member 16 and the support surface 20.

The waterproof operating device 10 further includes at least one button 18 and, more typically, a plurality of buttons 18. Each button 18 includes a head portion 34 and a shaft portion 36. In the assembled configuration, the head portion 34 of the button 18 is received within the corresponding well 38 of the cover plate 14 with a radial clearance 50 being provided between a radial periphery 34c of the head portion 34 and an inner wall 38b of the corresponding well 38. The clearance 50 allows water to penetrate under the head portion 34 of the button 18, thereby reducing the amount of water pressure that would typically be exerted on the head portion 34, and allowing water pressure to be directly exerted on the shaft portion 36 the button 18 instead. The well 38 provides support for the button 18, such that the button 18 does not move from side to side or lean on one side while the button 18 is being depressed, which could cause binding or pinching of the elastic member 16.

A first major surface 34a of the head portion 34 is provided for contact by a user. The first major surface 34a faces away from the well 38. A second major surface 34b is also provided opposite the first major surface 34a and facing the cover plate 14. The user depresses the button 18 by contacting the first major surface 34a and applying force to the head portion 34 to move the button 18 and to initiate a desired operation. However, movement of the button 18 may be limited by a bottom or closed end 38a of the well 38. More specifically, when the button 18 is depressed, the head portion 34 may be permitted to contact and be stopped by a closed end of the well 38 in the cover plate 14. Accordingly, the button 18 can only move the limited distance of approximately 0.080 inches. Thus, there is essentially a gap of a depth of 0.080 inches between the second major surface 34b of the head portion 34 and the closed end of the well 38. The well 38 serves as a protective ring that covers the gap, so that a user will not be able to pry the button 18 out of the cover plate 14.

The shaft portion 36 of the button 18 extends through the opening 24 in the cover plate 14, and at least a portion of the length of the shaft portion 36 is received within the protrusion 30 of the elastic member 16 by a close-fitting relationship, such that a distal tip 36a of the shaft portion 36 engages the closed end 30b of the protrusion 30. Preferably, a majority of the entire length of the shaft portion 36 is received within the protrusion 30. The close-fitting relationship is achieved because the elasticity of the protrusion 30 enables the recess formed between the open end 30a and the closed end 30b to conform to the size, and more particularly the diameter, of the shaft portion 36 received therein. The diameter of the shaft portion 36 is generally substantially smaller than a diameter of the head portion 34.

The distal tip 36a of the shaft portion 36 comprises an elongated body 44 and a flange 46 (see FIG. 1). The elongated body 44 is of a cross-sectional size smaller than the cross-sectional size of the remainder of shaft portion 36. More particularly, the elongated body 44 is of a diameter less than a diameter of a remainder of the shaft portion 36, such that the button 18 is secured within the protrusion 30 of the elastic member 16 by the flange 46, which preferably is of a maximum diameter of at least equal to that of the remainder of the shaft portion 36. Such a configuration of the distal tip 36 ensures that the button 18 remains secured within the protrusion 30, so that the button 18 will be mechanically retained within the protrusion 30 and not easily be removed therefrom, such as by the spring action of the elastic member 16, external vibrations or by the user. Other forms of mechanical and even adhesive engagement can be used.

Movement of the button 18 will result in stretching of the protrusion 30. Specifically, when the button 18 is depressed, the protrusion 30 of the elastic member 16 is stretched in a direction parallel to a tubular length L of the protrusion 30, such that the distal closed end 30b of the protrusion 30 moves in the direction parallel to the tubular length L. The elastic member 16 is maintained in continuous and direct contact with the cover plate 14 and the support surface 20 from the at least one opening 22 formed through the support surface 20, which receives the protrusion 30, and the at least one opening 24 formed through the cover plate 14 outward at least beyond an area covered by the head portion 34 of each button 18

Where the device 10 includes a plurality of buttons 18, the head portion 34 of each button 18 is received within a corresponding well 38, spaced apart from the inner wall 38b of the well 38, and a majority of the entire length of the shaft portion 36 of each button 18 is received within a corresponding protrusion 30 of the elastic member 16 by a close-fitting relationship. Also, depression of one button 18 of the plurality of buttons 18 results in the closed end 30b of the corresponding protrusion 30 moving in the direction parallel to the tubular length L of the protrusion 30. Further, the elastic member 16 has a thickness between the first and second major surfaces 26 and 28, respectively, and between at least one immediately adjoining pair of the plurality of the protrusions 30, such that the first major surface 26 is maintained in continuous direct contact with the cover plate 14 and the second major surface 28 is maintained in continuous direct contact with the support surface 20 between the at least one immediately adjoining pair of the plurality of the protrusions 30.

The protrusion 30, in an unstretched state, is preferably of a uniform radial thickness $T_R$ around the remainder of the length of the shaft portion 36 of the button 18 received therein. The closed end 30b of the protrusion 30 preferably has an axial thickness $T_A$ greater than the uniform radial thickness $T_R$ of the tubular wall 32 around the remainder of the length of the shaft portion 36 received within the protrusion 30 to resist puncture by the distal tip 36a of the shaft portion 36. The axial thickness $T_A$ of the closed end 30b of the above described protrusion 30 is approximately 0.060 inches. The axial thickness $T_A$ of the closed end 30b is preferably relatively thick to provide added wear resistance because the closed end 30b of the protrusion 30 is the end that contact a switch element 48, as discussed more fully below. A relatively smaller radial thickness $T_R$ of the tubular wall 32 is preferable so that less water pressure acts upon the device 10. Specifically, the radial thickness $T_R$ of the tubular wall 32 is directly related to the spring force exerted by the elastic member 16 against depression of the button 18. Thus, the radial thickness $T_R$ may be adjusted based on the spring force required for the desired depth of use of the device 10.

As an example, for an elastic member 16 made of silicone and used with buttons 18 having shaft portions 36 with a maximum diameter of 0.093 inches and a range of motion of 0.080 inches, the radial thickness $T_R$ of the unstretched tubular member 32 around the maximum shaft diameter is preferably approximately 0.200 inches and the axial thickness $T_A$ of the closed end 30b is approximately 0.500 inches. These dimensions provide a stretch of less than 0.080 inches of the protrusion 30 from water pressure on the button 18 at a depth of more than sixty meters. The materials of construction of the various components, such as the material of the elastic member 16, will affect the dimensions of the protrusion 30.

Also, the elastic member 16 maintains continuous direct contact with the support surface 20 and the cover plate 14 regardless of whether the protrusion 30 is relaxed (i.e., unstretched) or stretched. Further, because the elastic member 16 is tightly retained between the cover plate 14 and the support surface 20, depression of the button 18 will not cause stretching of this portion of the elastic member 16. Accordingly, no gaps are created between the elastic member 16 and the cover plate 14 or the elastic member 16 and the support surface 20 by depression of the button 18. Accordingly, the close-fitting relationship of the elastic member 16, the support surface 20 and the cover plate 14 is sufficiently maintained to form a waterproof seal even when the button 18 is depressed.

The waterproof operating device 10 also includes at least one switch element, indicated generically by block 48, and more preferably a plurality of switch elements 48, not depicted, each associated with one of the plurality of protrusions 30. The switch element 48 is located within the pressure resistant housing 12 in a position so as to be actuated by the closed end 30b of the protrusion 30 of the elastic member 16 with the button 18 sufficiently depressed. Specifically, the switch element 48 is located within the housing 12 proximate to, but spaced apart from, the distal closed end 30b of the protrusion 30. With the elastic member 16 being maintained in direct contact and close-fitting relationship with the cover plate 14 and the support surface 20, the elastic member 16 provides a waterproof barrier for the plurality of openings 22 and 24 through the support surface 20 and cover plate 14, respectively, such that water cannot reach the switch element (s) 48.

As described above, depressing the button 18 causes movement of the shaft portion 36 and stretching of the protrusion 30 in the direction parallel to the tubular length L of the protrusion 30. Accordingly, the closed end 30b moves in the direction parallel to the tubular length L to directly contact and actuate the switch element 48 located directly opposite and proximate to the closed end 30b. Thus, depression of the button 18 directly actuates the switch element 48 to initiate the desired operation.

Alternatively, the switch element 48 may be indirectly actuated by the button 18. According to this embodiment, a lever (not shown) is positioned proximate to and between the closed end 30b and the switch element 48. When the button 18 is depressed, the protrusion 30 is stretched and the closed end 30b moves until it contacts the lever. Further depression of the button 18 causes the lever to move or pivot from a first position to a second or actuation position. In the second position, the lever directly contacts and then actuates the switch element 48.

Where the waterproof operating device 10 includes a plurality of openings 22, 24, protrusions 30, buttons 18 and switch elements 48 clustered together, the waterproof operating device 10 essentially constitutes or includes a waterproof keypad 100. Specifically, referring to FIGS. 1-2, according to this embodiment, the support surface 20 of the housing 12 has a plurality of openings 22 formed therethrough; the cover plate 14 includes a plurality of raised cylindrical sections 15, a plurality of wells 38 formed therein, and a plurality of openings 24 formed therethrough; and the elastic member 16 has a plurality of the protrusions 30. The support surface 20 rests within a depression formed within the housing 12 and has edge or sidewalls 21 which extend upwardly away from a surface 20a of the support surface 20 and receive and confine the elastic member 16 on all sides, except for the first major surface 26.

The openings 22, the openings 24 and the protrusions 30 are positioned at corresponding spaced apart locations, such that their positions all correspond with each other so as to be coaxially aligned. Accordingly, with the cover plate 14 positioned over the support surface 20, the positions of the plurality of openings 24 in the cover plate 14 correspond to (i.e. align with) the positions of the plurality of openings 22 in the support surface 20. Also, with the elastic member 16 positioned between the cover plate 14 and the support surface 20, the tubular wall 32 of each protrusion 30 passes through a corresponding opening 22 of the plurality of openings 22 in the support surface 20. Because the openings 22 in the support surface 20, the openings 24 in the cover plate 14, and the protrusions 30 of the elastic member 16 are of corresponding positions, the cover plate 14, elastic member 16 and the support surface 20 preferably have essentially the same length and width dimensions, such that they are of substantially the same area.

According to this embodiment, the plurality of switch elements 48 are located within the pressure resistant housing 12, such that one of the plurality of switch elements 48 is actuated by the closed end 30b of a separate one of the plurality of protrusions 30. Specifically, by sufficient depression of the corresponding button 18 of the protrusion 30, one of the plurality of switch elements 48 is actuated, directly or indirectly, by the closed end 30b of the corresponding protrusion 30.

The configuration of the buttons 18 in the cover plate 14 along with the design of the elastic member 16 and, more particularly, the design of the protrusions 30, allows for superior resistance of the waterproof operating device 10 against water pressure that is inevitably exerted on the button 18 when the device 10 is used in an underwater application. The effect of water pressure is diminished by the clearance provided between the head portion 34 of each button 18 and the inner wall of the well 38 receiving the button. As such, the net force applied by water to the button 18 is proportional to only the diameter of the button shaft 36, as opposed to the diameter of the head portion 34 which is generally substantially larger than the diameter of the shaft portion 36. Such water pressure will cause increasingly greater depression of the button 18 with increasing depth and, thus, could cause unintentional actuation of the switch element 48. However, the elastic member 16 of the present invention acts a spring to counteract the water pressure on the button shaft portion 36 and to prevent unintentional actuation of the switch element 48.

Specifically, the protrusion 30 of the elastic member 16 is dimensioned for the material used and the desired range of motion of the button 18 to be sufficiently resilient to resist water pressure exerted on the button 18 to a depth in water of greater than ten meters (approximately thirty-three feet) and, preferably, up to a depth in excess of thirty meters (approximately one hundred feet), for example, about forty meters (approximately one hundred and thirty feet), and even more preferably, up to a depth of at least sixty meters (approximately two hundred feet), without actuation of the proximal switch element 48. It will be appreciated that the protrusions 30 of the elastic member 16 can be designed for any level of resistance to water pressure for any desired depth by controlling the stretch of the protrusion 30. It will be appreciated that for any elastomer selected, the amount of stretch of a protrusion 30 for a given pressure level (depth) is controlled by the selected combination of material wall thickness and length (unstretched) of the protrusion 30.

According to the waterproof keypad embodiment, each protrusion 30 of the elastic member 16 has the above described configuration and dimensions. Thus, each protrusion 30 is sufficiently resilient to resist water pressure exerted on the corresponding button 18 to a depth in water of greater than ten meters (approximately thirty-three feet), at least up to thirty meters (approximately one hundred feet) and preferably up to at least sixty meters (approximately 200 feet), without actuation of one of the plurality of switch elements 48.

Figure 5:
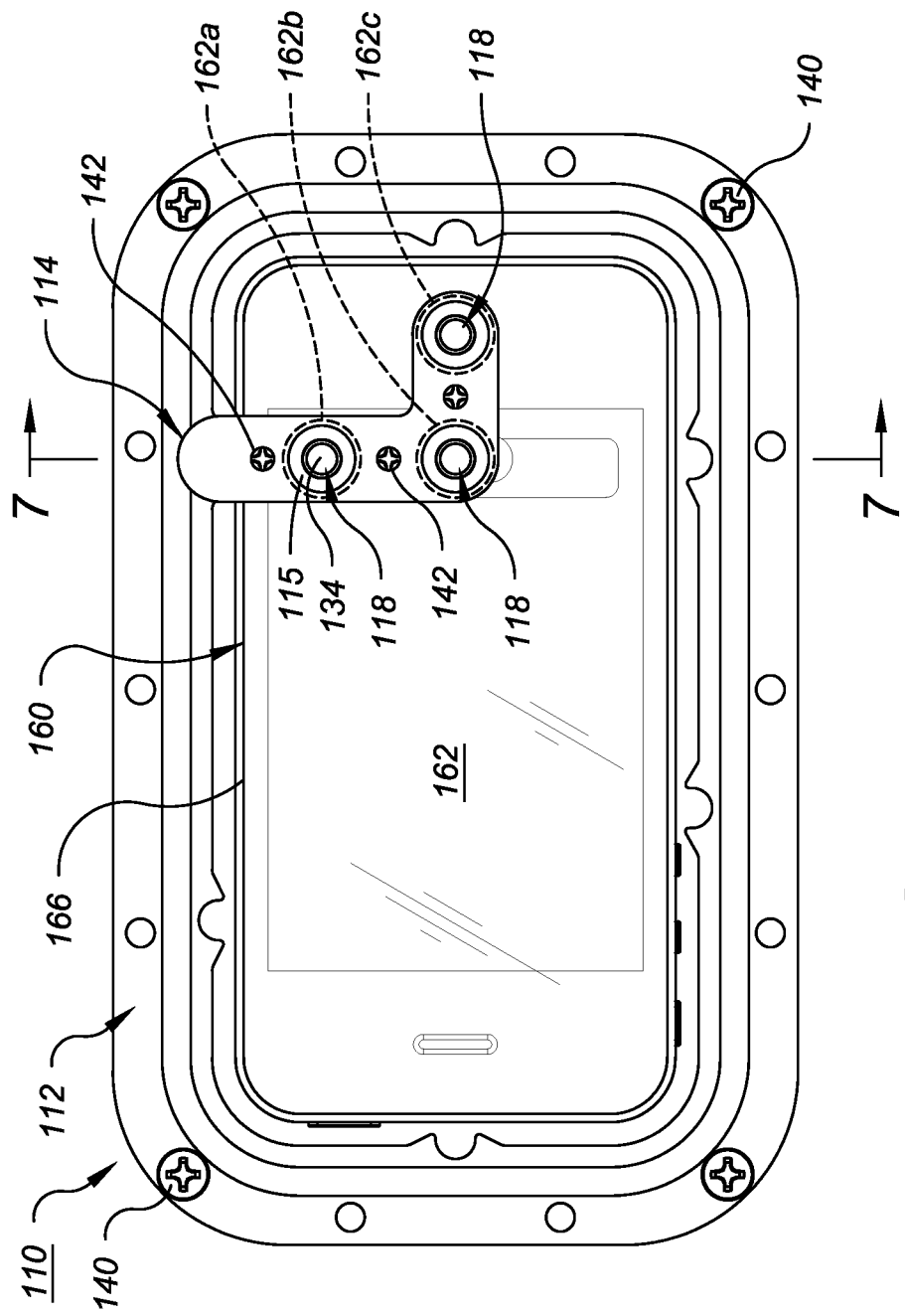
Figure 6:
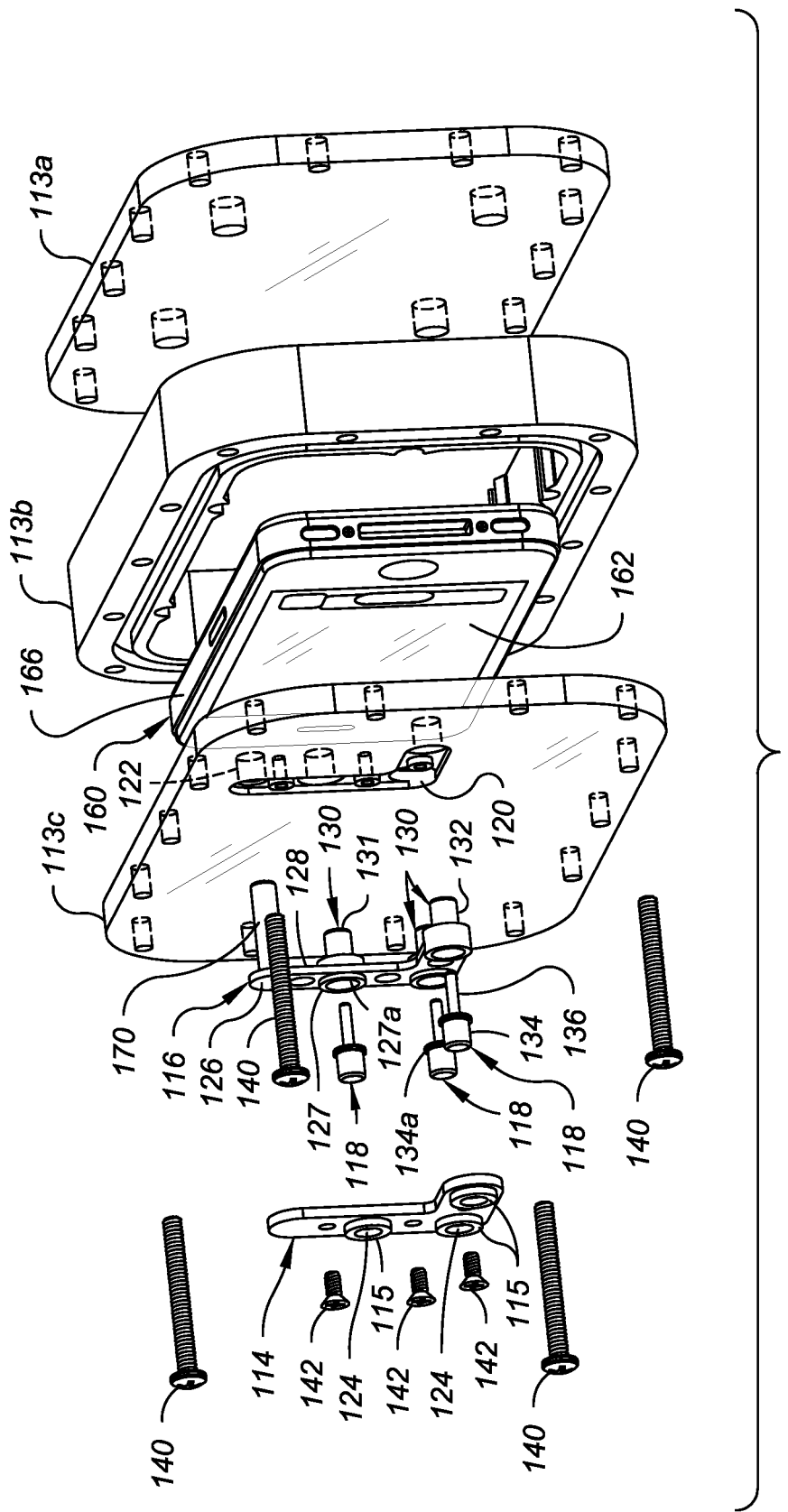
Figure 7:
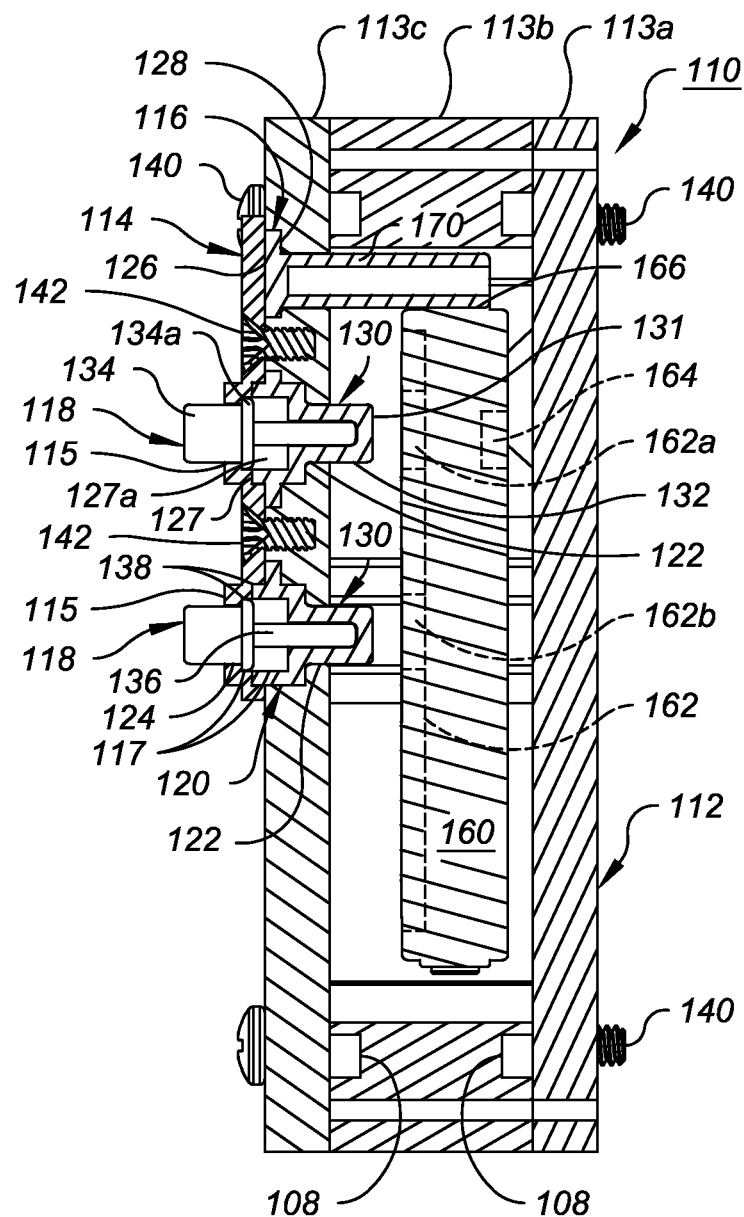

FIGS. 5 through 7 another waterproof operating device 110 according to the present invention. Like device 10, device 110 also includes a pressure resistant housing indicated generally at 112, cover plate or simply "cover" 114 and elastic member 116. The device 110 is shown configured to contain and operate a "smart phone" type of electronic device 160 as an underwater camera. Electronic smart phone device 160 has a capacitive touch screen 162 for user inputs. The touch screen 162 also generates visual displays to the user and so, also constitutes a graphic user interface of the device 160. The electronic device 160 also has a camera lens 164 (in phantom in FIG. 7) on a major side facing away from the touch screen 162 that is viewed and operated through the touch screen. The electronic device 160 also includes an electrically conductive outer case 166. A plurality of buttons 118 are exposed on the housing 112 for user movement. A plurality of localized areas of the touch screen 162 are provided via software in the device 160 as control regions, three being indicated diagrammatically, in phantom, in FIG. 5 at 162a, 162b, 162c, to receive user inputs (i.e. touches) to control the functional operation of the device 160 as a camera. The buttons 118 overlie the regions 162a-162c to make and break electrical connections provided in the housing 112 between the control regions 162a-162c and the conductive outer case 166 of the device 160.

A housing of the invention includes a plurality of essentially rigid, interfitting housing pieces configured to removably receive and essentially immobilize the electronic device 160. The preferred housing 112 has three interfitting pieces: a rear panel 113a, a tubular center piece 113b and a front panel 113c. The housing pieces 113a-113c are configured by sizing and shaping of their inner facing surfaces to releasably receive and immobilize a smart phone type electronic device 160. To waterproof the joints existing between the tubular center piece 113b and each adjoining panel 113a, 113c, conventional gasketing such as O-rings 108 (FIG. 7) may be provided. At least the rear and front panels 113a and 113c are sufficiently transparent to view the touch screen 162 and to provide a field of view to the camera lens 164, respectively. A first interfitting piece, the rear panel 113a, provides a support surface 120 of the housing 112. Cover 114 is configured to overlie the support surface 120, the elastic member 116, which is captured between the cover 114 and the support surface 120 so as to seal a joint formed between the cover 114 and the support surface 120 and, more particularly, openings 122 entirely through the support surface 120 and rear panel piece 113a from water penetration. In this embodiment, the manual actuators, buttons 118 are also captured between the cover 114 and support surface 120. The elastic member 116 has a first major surface 126 facing the cover 114 and away from the installed electronic device 160 and an opposing, second major surface 128 facing the installed electronic device 160 and the support surface 120.

Preferred housing 112 includes screw fasteners 140 at the four corners of the housing pieces 113a-113c to secure the pieces together. Each screw 140 is received in a threaded closed bore in the front cover 113c. Preferably too, screw fasteners 142 are provided extending through the cover 114 and through the elastic member 116 at the ends and angle of the generally L shaped elastic member 116 to further immobilize that member against movement from water pressure. Removable fasteners, preferably screws 142, are received in threaded closed bores in the support surface 120. The support surface 120 is preferably recessed in the shape of the elastic member 116 (generally "L") to receive the elastic member 116 and permit direct contact of the rear panel 113a with the center tubular piece 113b completely around the elastic member 116 and also through the elastic member. Circular screw bosses are provided on the face of the support surface 120 by not relieving the surface to provide threaded bosses to receive the screws 142 (see FIG. 7). Alternative housing constructions are to be considered as part of the invention. For example, the housing may be of two parts that are sealingly held together by suitable means such as a quick release latch (not depicted) for easier use of the housing.

A plurality of movable buttons 118 are provided on the housing 112 for user inputs to the contained electronic device 160. In the depicted embodiment 112, three identical buttons 118 extend from outside the cover 114 entirely through openings 124, 122 through each of the cover 114 and support surface 120, respectively, and into a separate one of three identical protrusions 130 of the elastic member 116.

Referring particularly to FIGS. 6 and 7, the configuration of each protrusion 130 is preferably like that of the protrusions 30 of the first embodiment of FIGS. 1-4. Each protrusion 130 extends from the second major surface 128 of the elastic member 116 with an elongated tubular wall 132 and terminates in a closed distal tip 131 directly opposite a separate control region 162a-162c (in phantom in FIG. 5) of the touch screen 162 with the electronic device 160 installed in the housing 112. The distal tip 131 is out of contact with the touch screen 162 while the protrusion 130 in an unstretched condition. A bore extends from the first major surface 126 through the plane of the elastic member 116 and the second major surface 128 into the protrusion 130 to form the hollow interior of the tubular wall 132. Each protrusion 130 is stretched in a longitudinal direction parallel to a tubular length of the protrusion 130 upon depression of the button 118 by a user. Also like the first embodiment device, each protrusion 130 of the elastic member 116 is configured for the material selected to resist extension due to water pressure exerted on the button 118 to a depth in water of greater than ten meters (thirty three feet) for underwater use without contacting the touch screen 162 and preferably to resist water pressure exerted on the button to a depth in water of up to at least sixty meters (two hundred feet) without contacting the touch screen for particular use in scuba diving.

Each button 118 is again preferably of the same general configuration as button 18 and has an elongated shaft 136 received within the hollow interior of the tubular wall 132 of the protrusion 130 and a head 134 of larger cross sectional diameter, which is exposed outside the waterproof housing 112 for user manual depression. However, in this embodiment, the head portion 134 includes a radially protruding flange 134a that is larger in diameter than the opening 126 of the cover 114 through which the distal end of the head portion 134 extends and is larger than the smallest diameter of the opening 122 through which its shaft passes through the support surface 120 so as to capture the head portion 134 between the cover 114 and the elastic member 116/support surface 120. Preferably the cover 114 includes a tubular projection 115 around the button opening 124, forming the opening 124, and an inward facing well 138 having an intermediate diameter larger than that of the opening 124 and that of the flange 134a and a largest diameter at the inner facing surface of the cover 114. The elastic member 116 preferably includes a tubular projection 127 concentric with the projection 130 and tubular wall 132 but extending from the opposite major surface 126 of the elastic member 116. Projection 127 also defines a well 127a facing well 138 of the cover 14. The facing wells 138 and 127a form a chamber 117 between the cover 114 and elastic member 116 capturing the flange 134a of the head portion 134 of each button 118 for linear movement in such chamber 117. Inward linear movement of the button 118 may be limited by contact of the flange 134a with the radially extending bottom wall of the well 127a or with the surface of the touch screen 162, as may be desired. Preferably, projection 127 extends into the largest diameter of the well 138 to compress against and sealingly mate with a circular flange surface of well 138 connecting the intermediate diameter with the largest diameter of the well 138. This compressed mating provides the waterproof seal about the opening 122 receiving the protrusion and takes the place of the ridges 31, 31' provided in the earlier embodiments surrounding all of the protrusions 30, 30' and through openings 22 of corresponding the support surface 20. Given the elongated configuration of the cover 114, membrane 116 and support surface 120, these individual seals were preferred but a single perimeter seal could be provided in a closed loop surrounding all of the projections 130 or their corresponding projections 127. It will be appreciated that the individual seals of the type formed in this embodiment 110 might be provided around each protrusion 30, 30' of the earlier embodiment or a provided projection.

Also like the first elastic member 16, the tubular walls 132 of the protrusions 130 of this embodiment are of a uniform diameter and thickness along their length (at least to the extent permitted by the requirements of molding the member) and the axial thickness of the protrusion 130 at the distal tip 131 is greater than the radial thickness of the tubular wall 132. Further like the first embodiment 16, the elastic member 116 of this embodiment preferably has a thickness from the each protrusion 130 radially outward all around the protrusion 130, such that the first and second major surfaces 126, 128 of the elastic member 116 are maintained in continuous direct contact with the cover 114 and the support surface 120, respectively, from the first opening through the support surface 120 receiving the protrusion 130 and the button 118 and the first opening through the cover 114 outward to at least beyond an area covered by the head portion 134 of the button 118 to maintain a seal between the elastic member 116 and the support surface 120 even at depth.

There is a separate button 118 provided extending through the cover 114 and received in the elastic member 116, extending through an opening through the support surface 120 and into a separate projection for each separate control region 162a, etc. of the capacitive touch screen 162 that needs to be contacted to control the camera function or other functions of the electronic device 160. In the depicted embodiment 110, there are three identical adjoining protrusion 130 and button 118 combinations to control three separate but adjoining control regions 162a, 162b, 162c of the touch screen 162. It will be appreciated that fewer or greater numbers of protrusion/ button pairs can be provided as needed or desired. It will further be appreciated that each protrusion 130 can be dimensioned to also operate a conventional electro-mechanical switch of the electronic device 160 with one or more moving parts using the same type of button 118. The housings of the invention may thus be configured to operate both capacitive and mechanical types of switches of an electronic device contained in a housing of the invention.

According to an important aspect of the invention, there is a physical electrical connection provided in the waterproof housing 112 between the conductive outer case 166 of the electronic device 160 held in the waterproof housing 112 and the closed distal tip 131 of each protrusion 130 opposite a capacitive control region 162a-162c of the touch screen 162 such that extension of the distal tip 131 into contact with corresponding opposing control region through manual depression of the button 118 in the protrusion 130 provides an electrical connection and completes an electrical circuit through the housing 112 between the conductive outer case 166 and the control region 162a-162c of the touch screen 162 that will activate the touched control region 162a-162c. Preferably each of the physical electrical connections/electrical circuits between the conductive outer case 166 and each individual control region 162a-162c is provided by means of the single, electrically conductive elastic member 116 itself. The buttons 118 constitute means operating from outside the housing 112 through the respective openings 122 through the housing 112 for manually completing the electrical circuits between the conductive outer case 166 and the respective control regions 162a-162c of the capacitive touch screen 162.

Preferably, at least a portion of the elastic member 116 is held in fixed/constant physical and electrical contact with the outer surface of the electrically conductive outer case 166 with the device 160 held in the housing 112. The portion of the elastic member 116 in constant contact with the case 166 is preferably another protrusion 170 of the elastic member 116, which extends through a separate opening 122 through the support surface 120 that is not aligned with any corresponding opening through the cover 114. Nor does protrusion 170 have to be tubular to receive a shaft portion of a button although it is tubular for other reasons including reduced weight and material costs and ease of molding. Portion/protrusion 170 extends through the support surface 120 and is compressed by the housing 112 into direct continuous physical contact and electrical connection with the conductive outer surface of the electrically conductive outer case 166 being held in the housing 112.

Furthermore, preferably, the electrical connection provided by and in the housing 112 between the conductive outer case 166 and the touch screen 162 is provided through the very material of the elastic member 116 itself. In this preferred embodiment, the entire elastic member 116 with all of the protrusions 130 and 170, is preferably an elastomeric membrane of uniform composition throughout formed monolithically (i.e. by molding) essentially of an electrically conductive elastic material of a uniform composition, such as an electrically conductive urethane or EPDM rubber or, more preferably, an electrically conductive silicone rubber.

It will be appreciated that the electrical connection between the electrically conductive outer case 166 and the control regions 162a, 162b, etc. of the touch screen 162 can be provided through the housing in different ways. Instead of the entire elastic member 116 being electrically conductive, only a portion or portions of it can be made electrically conductive, for example, by co-molding electrically conductive and insulative formulations of elastic material or by the providing electrically conductive graphite or other carbon traces on the outer surfaces of the protrusions 130, 170 and side 128 of the member 116.

Figure 8:
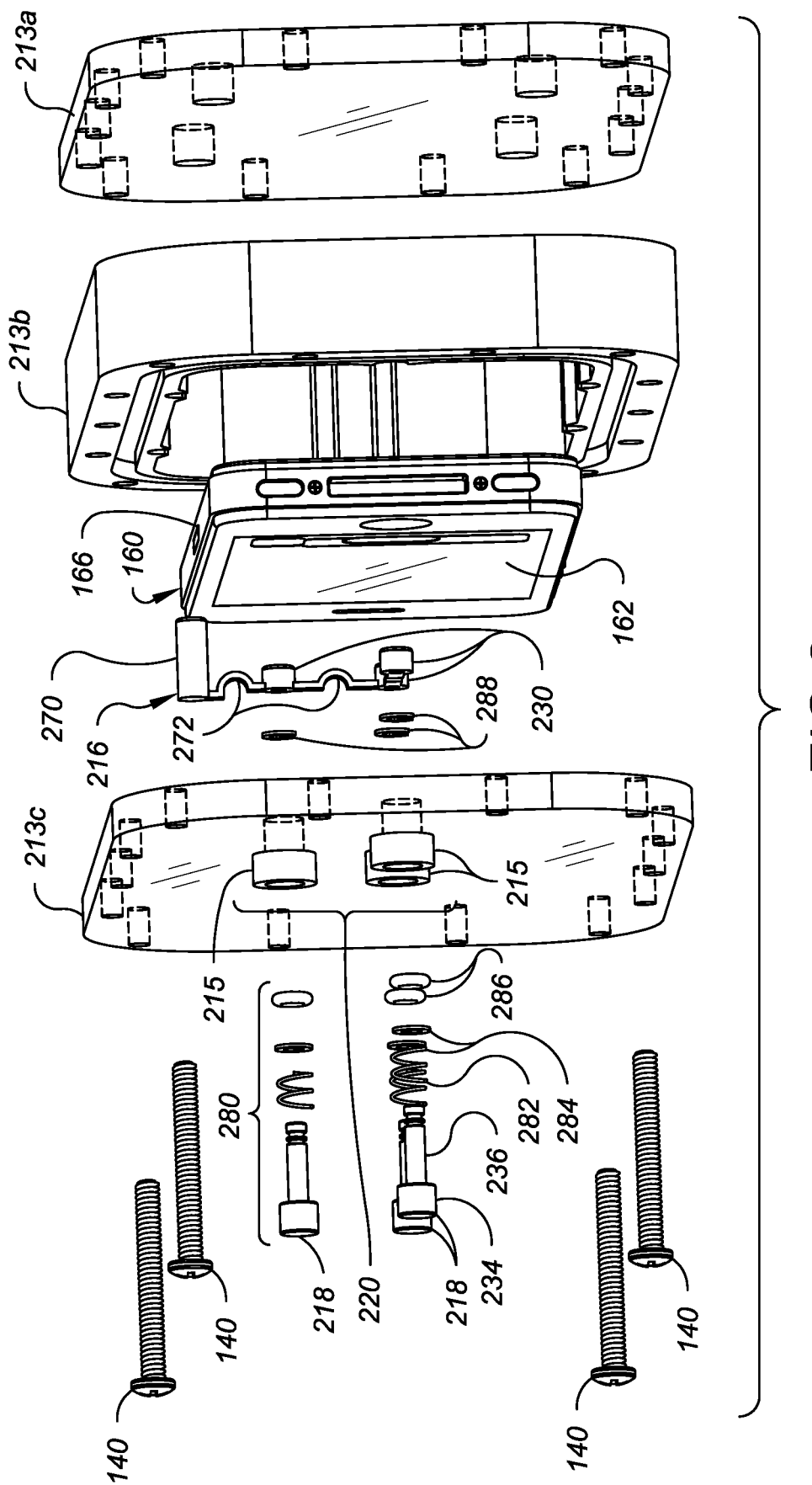
Figure 9:
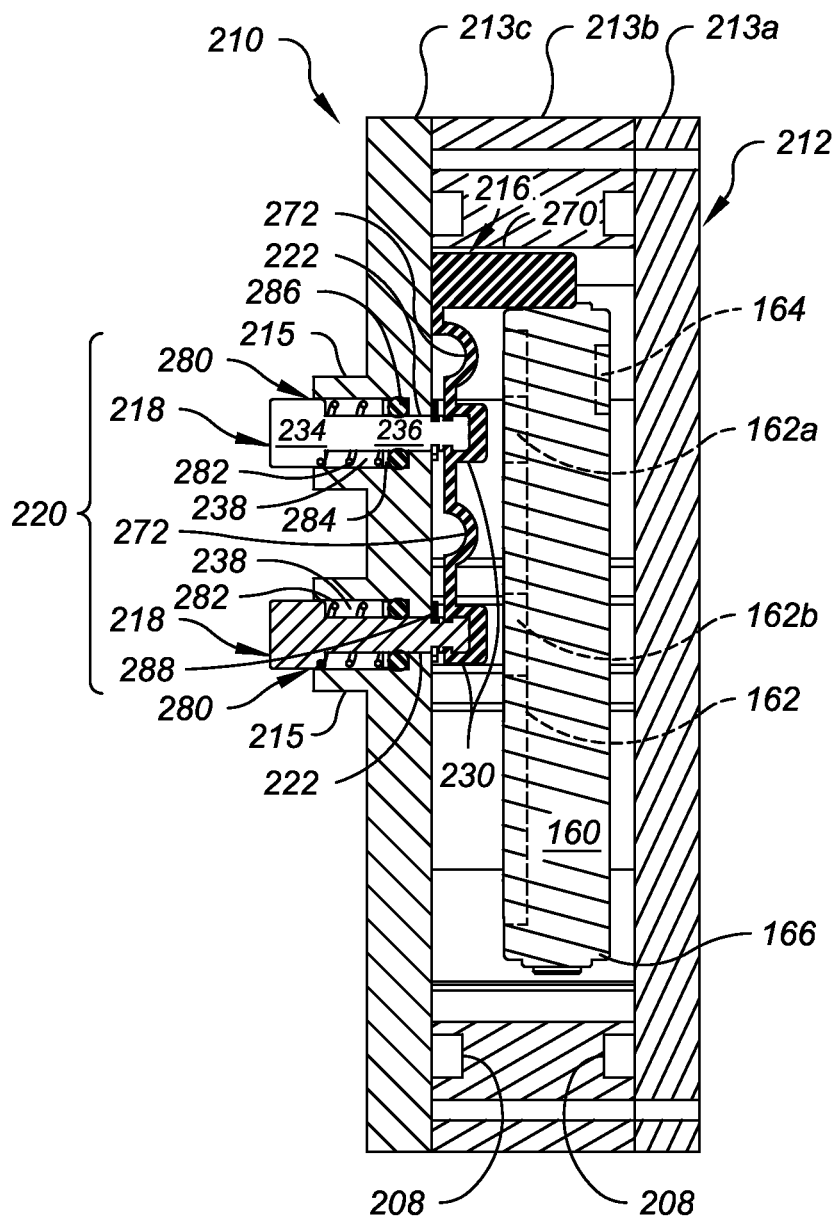

Pre-membrane, waterproof housing designs employing individual, user operable buttons extending through the housing with individual O-ring seals can also be modified to operate a capacitive touch screen. Referring to FIGS. 8 and 9, a waterproof operating device 210 includes a waterproof housing 210 of the present invention that is formed by a plurality of essentially rigid, interfitting housing pieces, 213a, 213b and 213c like pieces 113a-113c, configured to removably receive and essentially immobilize the electronic device 160. O-rings 208 (FIG. 9) are provided between pieces 213a, 213b and 213b, 213c. At least the rear and front panels 213a and 213c are again sufficiently transparent to view the touch screen 162 and to provide a field of view to the camera lens 164, respectively. Rear panel 213c provides a support surface 220 of the housing 212 having a plurality of through openings 222 each receiving a separate user operable button 218. Preferably, rear panel 213c includes a tubular projection 215 around each opening 222, forming an outward facing well 238 having a diameter larger than that of an innermost end of the opening 222. Each button 218 is part of an assembly 280 that includes, in addition to the button 218, a coil spring 282, washer 284, O-ring 286 and a C clip 288. The head 234 of each button 218 protrudes from the projection 215 and is linearly movably retained in the well 238 by C clip 288. Spring 282 biases the distal tip of the button 218 away from the touch screen 162 while O-ring 286 provides the waterproof seal between the button shaft 236 and the rear panel 213c.

An abbreviated conductive polymer membrane 216 is formed having a plurality of abbreviated protrusions, preferably caps 230, three being shown, replacing the protrusions 30, 30', 130 of the earlier embodiments. Each cap 230 is configured to receive an innermost distal tip of the shaft 236 of an individual button 218 and be captured on the tip by interference fit. The caps 230 are preferably physically and electrically connected in a chain to one another and to another protrusion 270 by webs 272, two of the three being seen, of the conductive polymer material from which the membrane 216 is preferably made. Like protrusion 170, protrusion 270 is configured to extend into direct physical contact and electrical connection with the electrically conductive outer case 166 of the electronic device 160 being held in the housing 212. However, unlike the previous embodiments, membrane 216 does not have a sealing or spring function and so need only be flexible and not elastic or at least as elastic as the original members 16, 116. Each cap 230 might be hollow to receive and mechanically engage the distal tip of the shaft 236 of a button 218 as shown or might just be configured to be bonded to the end face of the shaft 236 as its distal tip or solid to be depressed by the shaft of a button pressing against the outward facing surface of the membrane.

In the broadest sense, the electrically conductive connections could even be provided by hard wires in the housing 112, 212 between the outer case 166 and the distal tips 131 of the protrusions 130 or caps 230 with at least exposed ends of the wires touching the outer surface of the conductive outer case 166 and positioned at the distal tip 131 of a respective protrusion 130 or cap 230 to contact the touch screen 162 when the protrusion 130 or cap 230 is extended. In the embodiment 212, individual wires could replace the entire member 216.

FIGS. 10-15 depict another embodiment of the present invention for containing and operating an electronic device having a capacitive touch screen and an electrically conductive outer case. A waterproof housing 310 comprises a plurality of essentially rigid, interfitting housing pieces, a main body 313a and an end cap 313b being shown, which together form a pressure-resistant, waterproof shell 312 configured to removably receive and essentially immobilize an electronic device 360. A first housing piece, the main body 313a forming part of the shell 312, includes at least one and more typically a plurality of openings, four being shown at 318a-318d, respectively, which pass entirely through the first housing piece 313a into the interior of the shell 312. The housing 310 is also configured to operate a "smart phone" type of electronic device 360 as an underwater camera. Electronic smart phone device 360 has a capacitive touch screen which is indicated generally at 362 (seen though a transparent window of housing piece 313a in FIGS. 10 and 11) for user inputs and operates in conjunction with an electrically conductive outer case 366. The touch screen 362 has at least one and, more typically, a plurality of separate, spaced apart control regions used to operate the device 360 as a camera. Four such control regions 362a-362d are indicated by broken phantom lines in FIG. 11.

The waterproof housing 310 further include a removably tray 380 which is itself configured to removably receive and hold the electronic device 360 inside others of the interfitting housing pieces 313a, 313b forming the waterproof shell 312. Referring to FIGS. 13-14, the tray 380 includes a stationary portion 382 and at least one and, more typically, a plurality of members, which extend from one end 382a of the stationary portion 382 of tray 380. An opposing end 382b of the stationary portion of tray 382 is connected with the one end 382a by spaced apart, preferably parallel arms 382c, 382d. First, second, third and fourth members 384, 386, 388, 390 (numbered in FIG. 14) are depicted, movably coupled with the stationary portion 382 of the tray 380. Each member 384, 386, 388, 390 is preferably pivotally supported from the stationary portion 382, for example on a shaft 392 extending through the stationary portion 382 and an end of each members 384, 386, 388, 390 proximal an end 382a of the stationary portion 382. Each member 384, 386, 388, 390 extends from the stationary portion 382 of the tray 380 to a free end proximal a respective control region 362a-362d of the touch screen 362 in FIG. 13. Bias members such as torsion springs 394 are provided between each member 384, 386, 388, 390 and the stationary portion 382 to bias the free ends of the members 384, 386, 388, 390 away from the capacitive touch screen 362.

An electrical circuit is provided within the waterproof housing 310 extending between the electrically conductive outer case 366 of the electronic device 360 installed in the waterproof housing 310 and each control region 362a-362d of the capacitive touch screen 362 to be activated through the housing 310. Preferably, an electrical conductor in the form of an electrically conductive flexible member 316, more preferably, an electrically conductive elastomeric membrane like a conductive silicone, provides an electrical circuit between the conductive outer case 366 and each control region 362a-362d of the touch screen 362. Referring to FIG. 15, the flexible member 316 includes one end 316f located in the tray 380 so as to be held in fixed electrical connection with the conductive outer case 366 when the electronic device 360 is seated in the tray 380. A connective portion 316e of the conductive membrane 316 extends from the one end 316f along an end 382a of the stationary portion 382 of the tray 380. Individual first through fourth conductor portions 316a-316d of the membrane 316 extend continuously from the connective portion 316e to an opposing free end. The conductive portions 316a-316d are affixed by suitable means to the inner (touch screen facing) side of the movable members 384, 386, 388 and 390, respectively and extend to proximal a respective one of the first through fourth control regions 362a-362d of the touch screen 362. Thus, a first electric circuit is provided within the housing 310 extending between the electrically conductive outer case 366 of the electronic device 360 installed in the tray 380 in the shell 312 of the housing 310 and a first control region 362a of the capacitive touch screen 362 by a first electrical conductor provided by the one end 316f, the connective portion 316e and the first conductor portion 316a of the flexible membrane 316. Similarly, a second electric circuit is provided between the conductive outer case 366 and a second control region 362b by a second electrical conductor formed by the one end 316f, the connective portion 316e and the second conductor portion 316b of the flexible membrane 316. In all, the single, flexible, electrically conductive member/membrane 316 thus provides four circuits all having a common end 316f in fixed electrical connection with the conductive outer case 366 and a common portion 316e extending along the stationary portion 382 of the tray 380 to the individual free ends 316a-316d.

According to an important aspect of the invention, means are provided operating through the housing for manually completing or "making" the electrical circuits inside the housing 312 from outside the housing. More particularly, a first means is indicated generally at 320a in FIGS. 11, 13 and 14 and is provided operating through the first opening 318a for manually completing the first electrical circuit 316a/316e/316f from outside the shell 312 of the housing 310. In the described embodiment, similar second, third and fourth means 320b, 320c, 320d are provided similarly operating through second, third and fourth openings 318b, 318c, 318d through the waterproof shell 312 of the housing 310 for manually completing the second, third and fourth circuits 316b/316e/316f, 316c/316e/316f, 316d/316e/316f, from outside the housing 310. Only the first means 320a will be described in detail, it being appreciated that the details of the second through fourth means 320b-320d are the same. In particular, referring to FIG. 11, the first means 320a includes a manual actuator member in the form of a button 322 having a head portion 322a and a shaft portion 322b extending through the first opening 318a, a bias member in the form of a compression coil spring 324, and an O-ring 326 for sealing the first opening 318a from water penetration around the button 322. A protective washer 328 may be provided between O-ring 326 and the proximal end of spring 324. A cover 314 captures the components of the various means 320 between itself and the main body piece 313a of the housing 312.

In this embodiment of the invention, the first means 320a further includes a first intermediate member in the form of the first movable member 384 portion of the tray 380 that is movably coupled with the stationary portion 382 of tray 380. Thus, part of the tray 380 is also part of the first means 320a. The first means 320a is configured and located for moving a first conductor part 316a of the first electrical circuit 316a/316e/316f that extends along the first intermediate/movable member 384 into direct contact with the first control region 362a through manual actuation of the first means 320a, in particular, manual depression of the button 322 by a user. The button 322 is in overlying relationship with the first movable/intermediate member 384 to directly contact the member 384 and pivot it against the touch screen 362. Again, the second, third and fourth means 320b-320d are similarly configured with bias member springs 324, O-ring seals 326 and buttons 322 in overly relationship with and operating on and through movable/intermediate members 386, 388, 390 supporting electrical conductor parts 316b-316d of the second through fourth circuits for selective and independent movement of the second through fourth movable/intermediate members 386, 388, 390 with the second through fourth conductor parts 316b-316d into contact with the second through fourth control regions 362b-362d of the capacitive touch screen 362.

Figure 11:
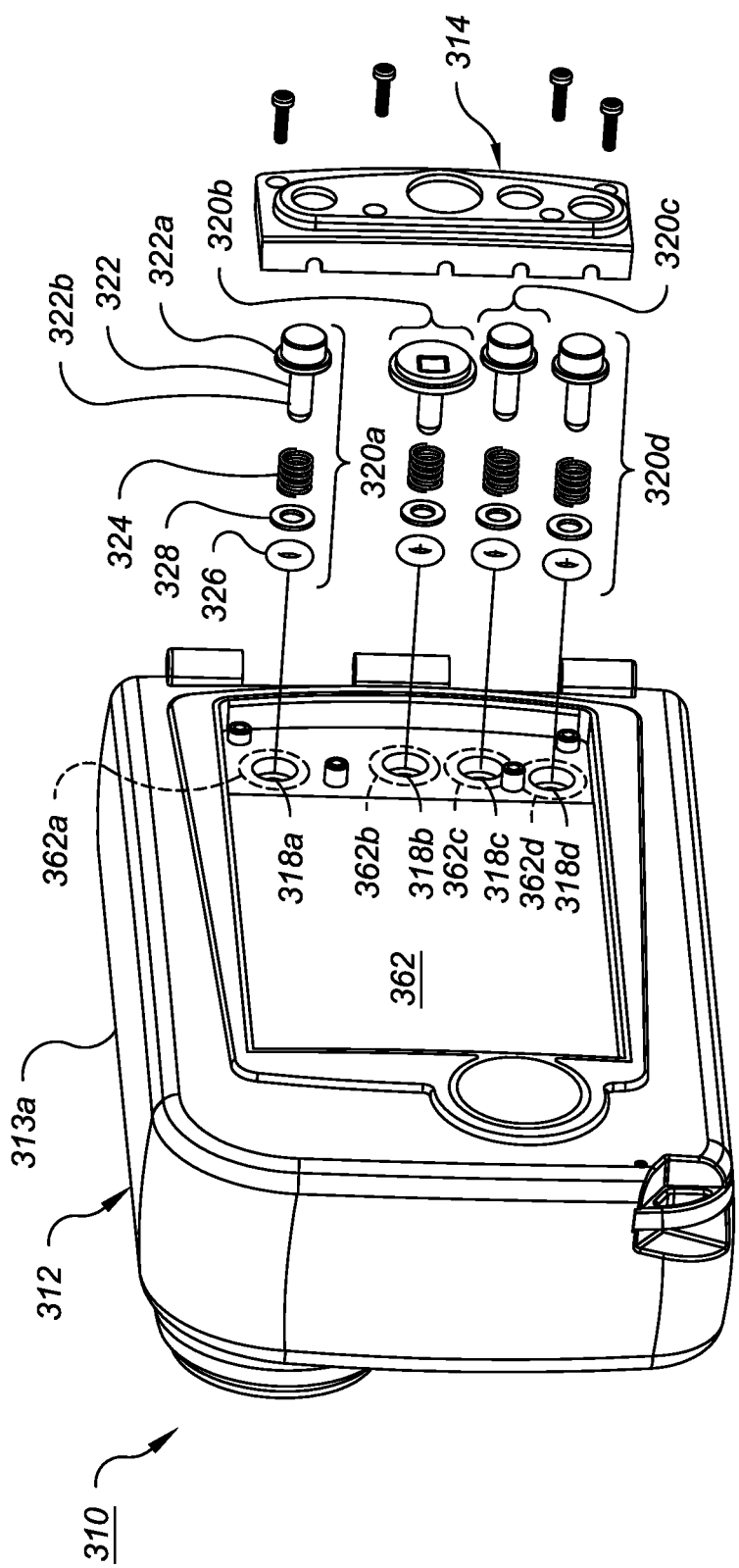

As is best seen in FIG. 11, the four openings 318a-318d extend in parallel to one another through the first housing piece/main body 313a and extend in a generally linear alignment across the first housing piece/main body 313a. It is possible to align and cluster the openings 318a-318d this way because the design permits the intermediate/movable members 384, 386, 388 and 390 to have various lengths between their connected and free ends. Thus, the length of first and second intermediate/movable members 384, 386 in FIGS. 13 and 14 are clearly different from one another and from the third and fourth intermediate/movable member 388, 390, whose lengths are substantially the same.

It will be appreciated that the present design with tray 380 allows adaption of the housing 310 to use with different electronic devices 350. Thus, the waterproof housing 310 could be provided with a second tray different from the first tray 380, the second tray being configured to removably receive and hold a second electronic device different from the first electronic device 360 inside the others of the interfitting housing pieces 313a, 313b forming the waterproof shell 312. Due to the likelihood of different locations of different control regions for different devices, it is likely that the lengths of corresponding intermediate/movable members would be different between the trays and that some trays may even lack one or more corresponding intermediate/movable members.

Moreover, the intermediate/movable members, when provided, may be of a generally L shape, rather than the I shape depicted so that the base of such member extends into alignment with one of the manual actuating means 320 on the shell 312 while the arm extending from the base onto the touch screen is aligned transversely with its respective control area. It will be appreciated that other shapes such as facing C or L shapes of differing lengths/sizes may be provided to align with control areas along the same horizontal line extending perpendicularly to the shaft 392 supporting such members.

FIG. 16 depicts another possible arrangement of tray 380 indicated as 380' in the figure. The connective membrane portion corresponding to 316e is extended along one or preferably both arms 382c', 382d' to the opposing end 382b' of the tray 380', preferably beneath lands (unnumbered) with extend inwardly from the arms 382c', 382d' and support and capture the electronic device 360 in the tray 380' between those lands and the ends 382a', 382b' of the tray 380'. In FIG. 16, connective membrane portion 316' wraps entirely around the tray 380' and beneath fingers 383 of the tray 380' extending out from 382b' to support the device (360) away from the membrane portion 316'. Membrane 316' includes a thickened portion 316f' that overlies an opening 382e' through end 382b'. Portion 316f is sized and positioned to be contacted by the case 366 of the conductive device 360 and pushed into the opening 382e' to be biased against the case 366 by the connected portions of the membrane 316'.

FIGS. 17, 18 and 19 depict other possible arrangements of circuits and means for their manual completions. In FIG. 17, a tray 480 is provided with fixed arms 484, 486, 488, 490 substituted for intermediate/movable members 384, 386, 388 and 390. A conductive member 416 is provided having one end 416f located to be held in constant fixed contact with the conductive outer case of an electronic device (not depicted) received in the tray 480 and a connective portion 416e that extends along part of the tray 480 directly opposite actuator buttons 422. Arms 484, 486, 488, 490, support affixed individual conductive members 416a-416d. Members 416a-d extend from beneath the distal tips of the respective arms 484, 486, 488, 490 facing and in fixed electrical connection with and against respective control regions of the touch screen of the electronic device. Opposing ends of the conductive members 416a-416d proximal the connective portion 416e are configured and positioned so that depression of an overlying button 422 completes an electrical connection and circuit between the proximal individual conductive members 416a-416d and the proximal connective portion 416e of the conductor 416e/416f.

FIGS. 18 and 19 illustrate two different possible arrangements of the proximal ends of the members 416a-416d and the connective portion 416e. FIG. 18 corresponds to the depiction in FIG. 17, where the proximal end of 416a and a proximal portion of 416e are separated by a small gap on stationary arm 484. An electrically conductive shaft 422b or at least an electrically conductive tip 422c of the shaft 422b of a button 422 is selectively extended by a user to provide direct contact with and an electrical connection between the proximal portions of conductor 416e/416f and the arm conductor 416a to complete the circuit between the respective control region 362a of the touch screen 362 and the conductive outer case 366. Similar arrangements are provided between conductors 416b-416d on arms 486, 488, 490 and proximal ends of conductor 416d/416f for selectively manually completing circuits between respective control regions 362b-362d and the conductive outer case 366.

In FIG. 19, the proximal ends of conductive portion 516a and portion 516e are arranged to overlie one another on stationary arm 584, separated by suitable means such as a ring 598 of non-conductive elastomer material generally concentric with the shaft 522b of a button 522 so that the portion of the conductor 516a (or any of 516b-516d) within a ring 598 can be selectively manually pressed into contact with the underlying connective portion 516e by the shaft 522b of a depressed button 522, thereby completing the circuit between the respective control region 362a-362d and the conductive outer case 366 of the device 360. Thus, the buttons 422 or 522 are configured and located for manually selectively electrically connecting the portion 412e or 516e of the electrically continuous conductor 416e/416f or 516e/516f (having one end 416f or 516f in fixed electrical connection with the conductive outer case 366 of the electronic device 360) and thereby selectively manually completing the electrical circuit between a respective control region 362a-362d of the capacitive touch screen 362 and the conductive outer case 366 by a user from outside the waterproof shell 312 of the housing 310.

It will be appreciated by those skilled in the art that changes could be made to the embodiments described above without departing from the broad inventive concept thereof. It is understood, therefore, that this invention is not limited to the particular embodiments disclosed, but is intended to cover modifications of the present invention as described by the appended claims.

I claim:

1. A waterproof housing for containing and operating an electronic device having a capacitive touch screen and an electrically conductive outer case comprising:

a plurality of essentially rigid, interfitting housing pieces forming a pressure-resistant, waterproof shell configured to removably receive and essentially immobilize the electronic device, a first housing piece forming part of the shell including at least a first opening entirely through the first housing piece into the shell;

a first electrical circuit extending between the electrically conductive outer case of the electronic device installed in the waterproof housing and a first control region of the capacitive touch screen; and first means operating through the first opening for manually completing the first electrical circuit from outside the housing.

2. The waterproof housing of claim 1 wherein the first electrical circuit includes an electrical conductor having one end in fixed electrical connection with one of the conductive outer case and the first control region of the touch screen and wherein the first means is configured and located for directly or indirectly electrically connecting an other portion of the electrical conductor with a remaining one of the conductive outer case and the first control region through manual actuation of the first means by a user.

3. The waterproof housing of claim 2 wherein the one end of the electrical conductor has one end in fixed electrical connection with the conductive outer case and wherein the first electrical circuit includes an other electrical conductor having one end in fixed electrical connection with the first control region of the touch screen and wherein the first means makes and breaks an electrical connection between the electrical connector and the other electrical connector.

4. The waterproof housing of claim 2 wherein the one end of the electrical conductor is in fixed electrical connection with one of the conductive outer case and the electrical conductor extends to proximal the first control region of the touch screen and wherein the first means is configured and located for moving the electrical conductor into direct contact with the first control region through manual actuation of the means by a user.

5. The waterproof housing of claim 4 wherein the electrical conductor is an electrically conductive flexible membrane.

6. The waterproof housing of claim 5 wherein the flexible membrane further seals the first opening against water penetration into the shell.

7. The waterproof housing of claim 1 wherein the interfitting housing pieces include a tray configured to removably receive and hold the electronic device inside others of the interfitting housing pieces forming the waterproof shell surrounding the tray.

8. The waterproof housing of claim 7 wherein at least part of the electrical circuit extends along the tray.

9. The waterproof housing of claim 8 wherein part of the tray is also part of the first means.

10. The waterproof housing of claim 8 wherein the first means includes a first intermediate member forming a portion of the tray movably coupled with a stationary portion of the tray, the first intermediate member and extending from the stationary portion of the tray to proximal the first control region, and wherein part of the first electrical circuit extends along the first intermediate member.

11. The waterproof housing of claim 1 further comprising:
a second opening through the shell spaced apart from the first opening;
a second electrical circuit extending between the electrically conductive outer case of the electronic device installed in the waterproof housing and a second control region of the capacitive touch screen different and spaced apart from the first control region; and
second means operating through the second opening for manually making and breaking the second electrical circuit from outside the housing separately and independently of making and breaking of the first electrical circuit with the first means.

12. The waterproof housing of claim 11 wherein the first and second electrical circuits have a common end in fixed electrical connection with the conductive outer case.

13. The waterproof housing of claim 12 wherein the first and second circuits are formed by a single, flexible, electrically conductive membrane extending from the conductive outer case to each of the first and second control regions of the touch screen.

14. The waterproof housing of claim 13 wherein the electrically conductive membrane further seals the first and second openings against water penetration into the shell.

15. The waterproof housing of claim 14 wherein the interfitting housing pieces include a tray removably receiving and holding the electronic device inside the others of the interfitting housing pieces forming the waterproof shell surrounding the tray.

16. The waterproof housing of claim 15 wherein at least parts of the first and second electrical circuits extend along the tray.

17. The waterproof housing of claim 16 wherein parts of the tray are also parts of the first and second means.

18. The waterproof housing of claim 17 wherein the first means includes a first intermediate member movably coupled with a stationary portion of the tray and extending from the stationary portion of the tray to proximal the first control region, part of the first electrical circuit extending along the first intermediate member and wherein the second means includes a second intermediate member movably coupled with the stationary portion of the tray and extending from the stationary portion of the tray to proximal the second control region, part of the second electrical circuit extending along the second intermediate member.

19. The waterproof housing of claim 18 wherein each of the first and second intermediate members has a connected end coupled with the stationary portion of the tray and a free end extending to proximal the respective first and second control regions and wherein lengths of the first and second intermediate members between the connected and free ends are different from one another.

20. The waterproof housing of claim 19 wherein the first means includes a first actuator button extending through the first opening into overlying relationship with the first intermediate member so as to move the first intermediate member against the first control region and wherein the second means includes a second actuator button extending through the second opening into overlying relationship with the second intermediate member so as to move the second intermediate member against the second control region.

21. The waterproof housing of claim 20 further comprising a third actuator button extending through a third opening through the shell into overlying relationship with a third intermediate member movably coupled with the stationary portion of the tray so as to move the third intermediate member against a third control region separate and spaced apart from the first and second control regions and wherein the first, second and third openings extend in parallel to one another through a first housing piece and extend in linear alignment across the first housing piece.

22. The waterproof housing of claim 20 wherein the tray is a first tray and the electronic device is a first electronic device and in further combination with a second tray different from the first tray, the second tray being configured to removably receive and hold a second electronic device different from the first electronic device inside the others of the interfitting housing pieces forming the waterproof shell.

23. The combination of claim 22 wherein the second tray has first and second intermediate members movably supported from a portion of the second tray held stationary in the shell and respectively aligned with each of the first and second openings and the first and second actuator buttons so as to be moved separately and independently by the first and second actuator buttons, respectively, at least one of the first and second intermediate members of the second tray having a length different from a length of a corresponding first and second intermediate member of the first tray.

\* \* \* \* \*